United States Patent
Hagood et al.

(10) Patent No.: US 6,785,437 B2
(45) Date of Patent: Aug. 31, 2004

(54) BEAM-STEERING OPTICAL SWITCHING APPARATUS

(75) Inventors: Nesbitt W. Hagood, Wellesley, MA (US); Kamyar Ghandi, Arlington, MA (US); Bob Cloutier, Lancaster, MA (US); Mike Borgen, Arlington, MA (US)

(73) Assignee: Continuum Photonics, Inc., Billerica, MA (US)

(*) Notice: Subject to any disclaimer, the term of this patent is extended or adjusted under 35 U.S.C. 154(b) by 0 days.

(21) Appl. No.: 10/254,325

(22) Filed: Sep. 24, 2002

(65) Prior Publication Data

US 2003/0076604 A1 Apr. 24, 2003

Related U.S. Application Data

(63) Continuation of application No. 10/190,198, filed on Jul. 5, 2002.
(60) Provisional application No. 60/326,775, filed on Oct. 3, 2001, provisional application No. 60/326,780, filed on Oct. 3, 2001, provisional application No. 60/365,743, filed on Mar. 18, 2002, provisional application No. 60/365,457, filed on Mar. 18, 2002, and provisional application No. 60/365,739, filed on Mar. 18, 2002.

(51) Int. Cl.[7] ................................. G02B 6/35
(52) U.S. Cl. .......................................... 385/16
(58) Field of Search ..................... 385/16–24

(56) References Cited

U.S. PATENT DOCUMENTS

| | | | |
|---|---|---|---|
| 4,204,744 A | 5/1980 | Wittman | |
| 4,303,302 A | * 12/1981 | Ramsey et al. | ............... 385/23 |
| 4,365,863 A | 12/1982 | Broussaud | |
| 4,543,663 A | 9/1985 | Laor | |
| 4,580,292 A | 4/1986 | Laor | |
| 4,651,343 A | 3/1987 | Laor | |
| 4,657,339 A | 4/1987 | Fick | |
| 4,696,062 A | 9/1987 | LaBudde | |
| 4,834,488 A | 5/1989 | Lee | |
| 5,135,295 A | 8/1992 | Jen et al. | |
| 5,206,497 A | 4/1993 | Lee | |
| 5,611,009 A | 3/1997 | Pan | |
| 5,727,099 A | 3/1998 | Harman | |
| 6,005,998 A | 12/1999 | Lee | |
| 6,301,402 B1 | 10/2001 | Bhalla et al. | |

FOREIGN PATENT DOCUMENTS

| | | | |
|---|---|---|---|
| DE | 19706053 A1 | 8/1998 | |
| JP | 59024804 | 2/1984 | |
| JP | 4275519 | 10/1992 | |
| JP | 06118318 | 4/1994 | |
| JP | 6222292 | 8/1994 | |
| JP | 3129854 | 1/2001 | |
| JP | 2002139684 | 5/2002 | |
| WO | WO-99/66354 A3 | 6/1999 | |
| WO | WO-00/76106 A1 | 6/2000 | |
| WO | WO-02/01274 A2 | 6/2000 | |
| WO | WO-01/50176 A1 | 1/2001 | |
| WO | WO 200201274 A2 * | 1/2002 | ........... G02B/26/02 |
| WO | WO-02/46825 A1 | 6/2002 | |

OTHER PUBLICATIONS

Claeyssen et al., "Mechanisms Based on Piezo Actuators," Smart Structures and Materials 2001, pp. 225–233.
Glockner et al., "Piezoelectrically Drive Micro–Optic Fiber Switches," Society of Photo–Optical Instrumentation Engineers, Apr. 1998, pp. 1229–1234.
Ozawa et al., "High–Speed Measuring Equipment of Fiber Core Position of Optical Fiber Array Using Piezo Actuator," IEEE International Conference on Robotics and Automation, 1995, pp. 672–678.

* cited by examiner

Primary Examiner—Akm Enayet Ullah
Assistant Examiner—Michelle R. Connelly-Cushwa
(74) Attorney, Agent, or Firm—Ropes & Gray LLP

(57) ABSTRACT

The systems and methods described herein are directed to motion transformers as well as their integration and/or assembly, for use in directing optical beams and positioning of small optical elements for creating a variety of tunable optical components. More particularly, the systems and methods can be applied to a free-space optical cross-connect switching apparatus with piezoelectric actuation.

59 Claims, 20 Drawing Sheets

BEAM-STEERING OPTICAL SWITCHING APPARATUS

CROSS-REFERENCE TO OTHER PATENT APPLICATIONS

This application is a continuation of U.S. application Ser. No. 10/190,198, filed Jul. 5, 2002; and claims the benefit of U.S. provisional Applications No. 60/326,775 and Serial No. 60/326,780, having a common filing date of Oct. 3, 2001, and of U.S. provisional Applications Nos. 60/365,743, 60/365,457, and 60/365,739, having a common filing date of Mar. 18, 2002, the subject matter of which is incorporated herein in its entirety.

FIELD OF THE INVENTION

This invention relates to a beam steering optical switching apparatus, particularly to a free-space optical cross-connect switching apparatus with piezoelectric actuation, or any micro-optical positioning or beam-steering device with piezoelectric actuation.

BACKGROUND OF THE INVENTION

All-optical free-space cross-connect switches typically consist of a fabric of optical emitters that launch a collimated beam, and another fabric of optical receivers. The emitters can be selectively connected to the receivers by varying the direction of the collimated beam so as to impinge on the selected receiver. Any combination of active and/or passive emitters and/or receivers can be combined to form 1×N, N×1, or N×N switch assemblies.

All-optical free-space cross-connect switches have been reported that either redirect a collimated beam that is launched in a fixed direction, or control the direction of a collimated beam. Switches that redirect a collimated beam typically rely on an arrangement of micro-mirrors that can be tilted, typically by applying an electrostatic force. Conversely, switches that control the beam direction have optical emitters that rotate or tilt in response to an applied actuation signal or change, the position of an optical emitter, such as a fiber tip, relative to the optical axis of a collimating lens, which varies the angle of the beam. Both types of optical switches can advantageously employ Micro-Electro-Mechanical Systems (MEMS) technology, with actuation provided by mechanical, electromagnetic, piezoelectric, photoactive ceramic or polymer, thermal, chemically-active polymer, electrostrictive, shape-memory alloy or ceramic, hydraulic and/or magneto-restrictive actuators and other types of actuators known in the art.

Micro-mirror devices are typically etched from a Si wafer, with the mirror elements formed as hinged reflection-coated platelets which have a poorly defined rest position and tend to flex when actuated, causing the redirected beam to loose collimation. The mirror devices are also essentially undamped which limits their response time.

Recently, optical emitters with a controlled beam pointing direction have been proposed that incorporate piezoelectric actuators. Piezoelectric actuators advantageously provide a fast response, produce large forces, have a high characteristic frequency for fast switching, and have a well-defined rest position. Additionally, they are low-cost and have low susceptibility to vibration. Movement of the piezoelectric actuator can be controlled by applying electrical charges to electrodes. For example, U.S. Pat. No. 4,512,036 describes bending the free end of a fiber in two directions perpendicular to the longitudinal axis of the fiber, with the fiber tip moving relative to a stationary lens. Other devices propose using piezoelectric actuators to move a lens in front of a stationary fiber in a plane perpendicular to the longitudinal axis of the fiber. However, practical piezoelectric actuators tend to have a limited displacement range, which limits the attainable tilt angle of the optical beam and hence also reduces the switching speed of the cross-connect switch and increases the sensitivity to vibration.

It has been proposed to amplify the displacement or stroke produced by piezoelectric actuators to increase the beam tilt angle. For example, U.S. Pat. No. 4,303,302 describes a simple lever arm with an optical fiber attached to the arm which is supported on its fixed end and mechanically coupled to a piezoelectric bimorph bending element near the fixed end of the lever arm. The free end of the lever arm with the end of the optical fiber could thereby move in a plane and be aligned with different optical fibers located on an arc. A different lever mechanism for increasing the tilt angle of a Gimbals-mounted fiber holder with a fiber/lens assembly emitting a collimated optical beam is proposed in PCT/GB01/00062. Such lever mechanisms, however, increase the mass to be moved by the piezoelectric transducer and hence disadvantageously reduce the characteristic frequency of the optical assembly and therefore also the switching speed of the cross connect switch.

The aforedescribed piezoelectric actuation mechanisms with levers are unlikely to benefit from inexpensive and reproducible batch fabrication processes, such as MEMS technology. With MEMS, mechanical elements, sensors, actuators, and electronics can be integrated on a common substrate using the micromachining technology derived from IC fabrication processes. Reliable high-performance products can be designed and optimized using computer automatic design tools, such as AutoCAD and the like.

The size of MEMS devices can range from several micrometers to millimeters, and can be precisely controlled by lithographic and etching processes that are standard in the semiconductor industry. Such miniaturization is particularly attractive for accurate actuation as well as optical sensing and positioning. In particular, miniaturization reduces size and increases port density of an all-optical switch, and can be extended to other tunable and/or programmable optical components in optical networks.

It would therefore be desirable to provide a piezoelectrically actuated motion transformer for beam steering and positioning in all-optical cross-connect switches that has a sufficient large beam deflection angle for a high port count and a fast switching speed and that can be manufactured reproducibly and inexpensively by conventional MEMS fabrication processes.

SUMMARY OF THE INVENTION

The present invention describes micromachined motion transformers as well as their integration and/or assembly, for use in the positioning of small optical elements for creating a variety of tunable optical components. Together with different types of small sized actuators, in particular piezoelectric actuators, the motion transformers allow dense packing into compact arrays of movable optical elements, which can in turn be used separately or together to implement higher-level optical functions, such as large port count all-optical switches for telecommunication networks.

According to one aspect of the invention, an optical positioning device is provided which includes an actuator for generating a mechanical movement, a moveable optical component, and a unitary assembly with a first connection to an actuator, a second connection to the optical component, and a third connection to a support housing. The unitary assembly imparts motion to the optical element relative to the support housing, in response to motion of the actuator.

According to another aspect of the invention, an optical switch with an optical positioning device is provided, wherein the optical positioning device includes an actuator for generating a mechanical movement, a moveable optical component, and a unitary assembly. The unitary assembly has a first connection to an actuator, a second connection to the optical component, and a third connection to a support housing. The unitary assembly imparts motion to the optical element relative to the support housing, in response to motion of the actuator.

According to yet another aspect of the invention, an optical positioning device of a type that employs an actuator for moving an optical component is provided, wherein the optical positioning device includes a unitary assembly with a first connection to an actuator, a second connection to the optical component, and a third connection to a support housing. The unitary assembly imparts motion to the optical element relative to the support housing, in response to motion of the actuator.

According to still another aspect of the invention, a unitary assembly for use in an optical positioning device that employs an actuator for moving an optical component is provided, wherein the unitary assembly includes a first connection to an actuator, a second connection to the optical component, and a third connection to a support housing. The unitary assembly imparts motion to the optical element relative to the support housing, in response to motion of the actuator.

Embodiments of the invention may include one or more of the following features. The optical component may include a component selected from the group consisting of a fiber, a lens, a mirror, a collimator, a prism, a filter, and a grating. The motion of the optical element may cause the formation and/or steering of an optical beam.

The unitary assembly may include a compliant coupling disposed between any combination of components selected from the group consisting of the actuator, the optical component, and support housing. The compliant coupling may include a bending flexure, a torsional flexure, an annular flexure, a membrane, a lever arm, a rigid link, and/or a gimbal. The actuator may be a piezoelectric actuator, an electrostrictive actuator, a magnetostrictive actuator, an electrostatic actuator, a thermal actuator, an electromagnetic actuator, and/or an electroactive polymer. The unitary assembly can be formed from one or more layers, such as a substrate. The unitary assembly can include at least one microfabricated element and/or a plurality of lever arms.

The optical positioning device may further include a stroke amplifier for amplifying the mechanical movement generated by the actuator.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN EMBODIMENTS

The systems and methods described herein are directed to motion transformers as well as their integration and/or assembly, for use in directing optical beams and positioning of small optical elements for creating a variety of tunable optical components. More particularly, the systems and methods can be applied to a free-space optical cross-connect switching apparatus with piezoelectric actuation.

Figure 1:
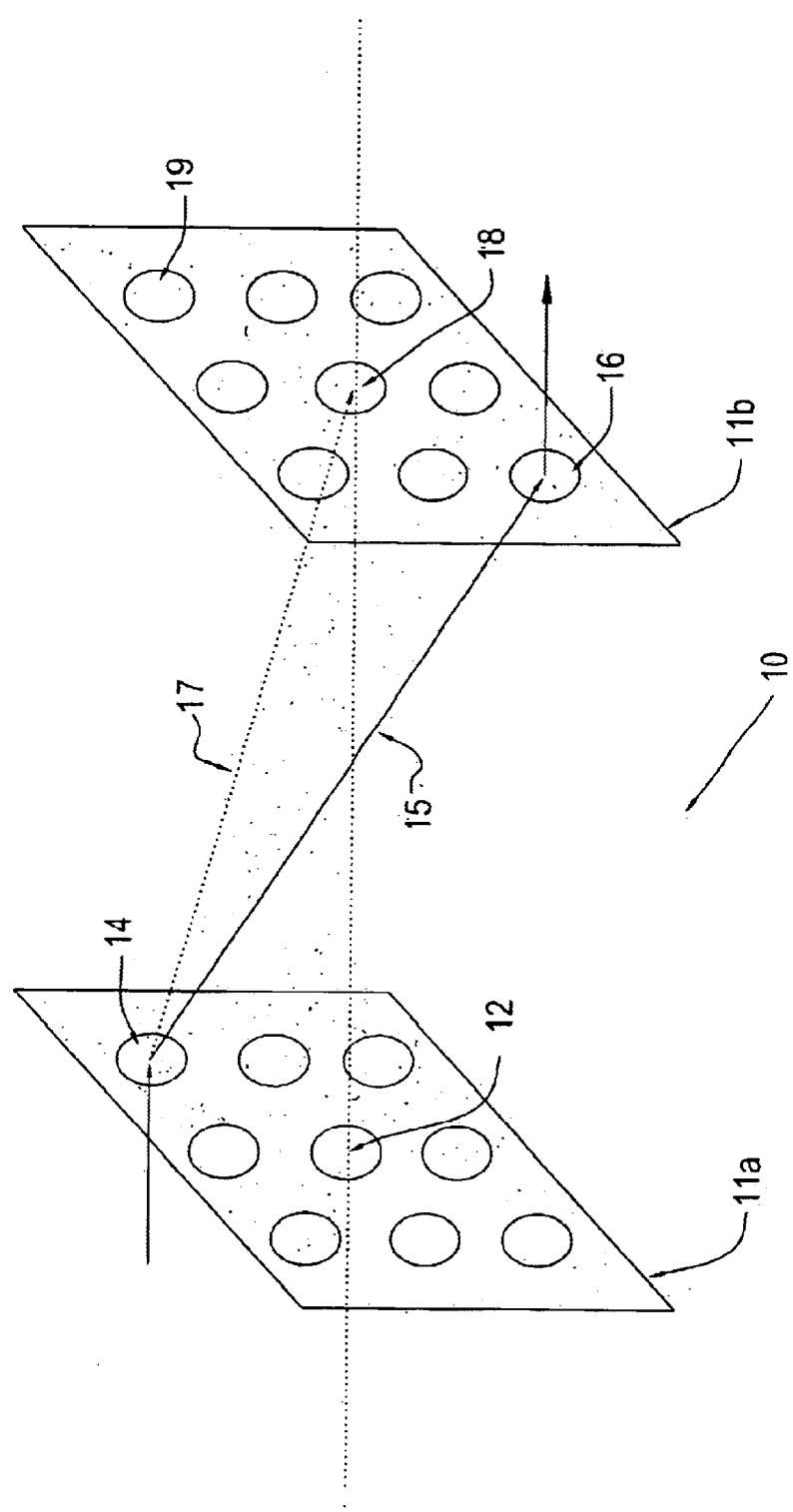
FIG. 1 is a schematic perspective view of an all-optical switch fabric.

Referring first to FIG. 1 an all-optical switch assembly 10 directs optical beams 15, 17 from optical emitters 12, 14 located on a first image plane 11a to receivers 16, 18 located on a second image plane 11b. The exemplary image planes 11a, 11b are shown as each having a 9-element switch matrix arranged symmetrically about a center axis CL to facilitate beam addressing and control. Emitters 12, 14 and receivers 16, 18 can be placed on either image plane 11a, 11b and can be intermixed. The illustrated configuration is therefore merely illustrative and not limiting in any way. For example, any combination of active and/or passive emitters and/or receivers can be combined to form 1×N, N×1, or N×N switch assemblies. In a practical application, an optical fiber can be connected to a respective beam steering device located in emitter/receiver locations in the corresponding image plane 11a, 11b. The optical beam emerging, for example, from emitter 14 in image plane 11a can be directed by the beam steering device to any port in the image plane 11b. Control of the beam steering devices can be simplified by passive alignment of the beam emerging from any emitter in one image plane, for example, image plane 11a, onto the centrally located receiver 18 on the opposite image plane 11b, as indicated by beam path 17. In this way, each emitter 12, 14 will require approximately the same beam deflection angle to reach all receivers 16, 18 on the opposing image plane regardless of the emitter location on the first image plane 11a. The exemplary ports are shown as being coupled to optical fibers, although other light emission and receiving devices known in the art could also be employed. Details of suitable methods for actively steering the optical beams 15, 17 will now be described. The actuation mechanism has been omitted from the figures for sake of clarity.

Figure 2:
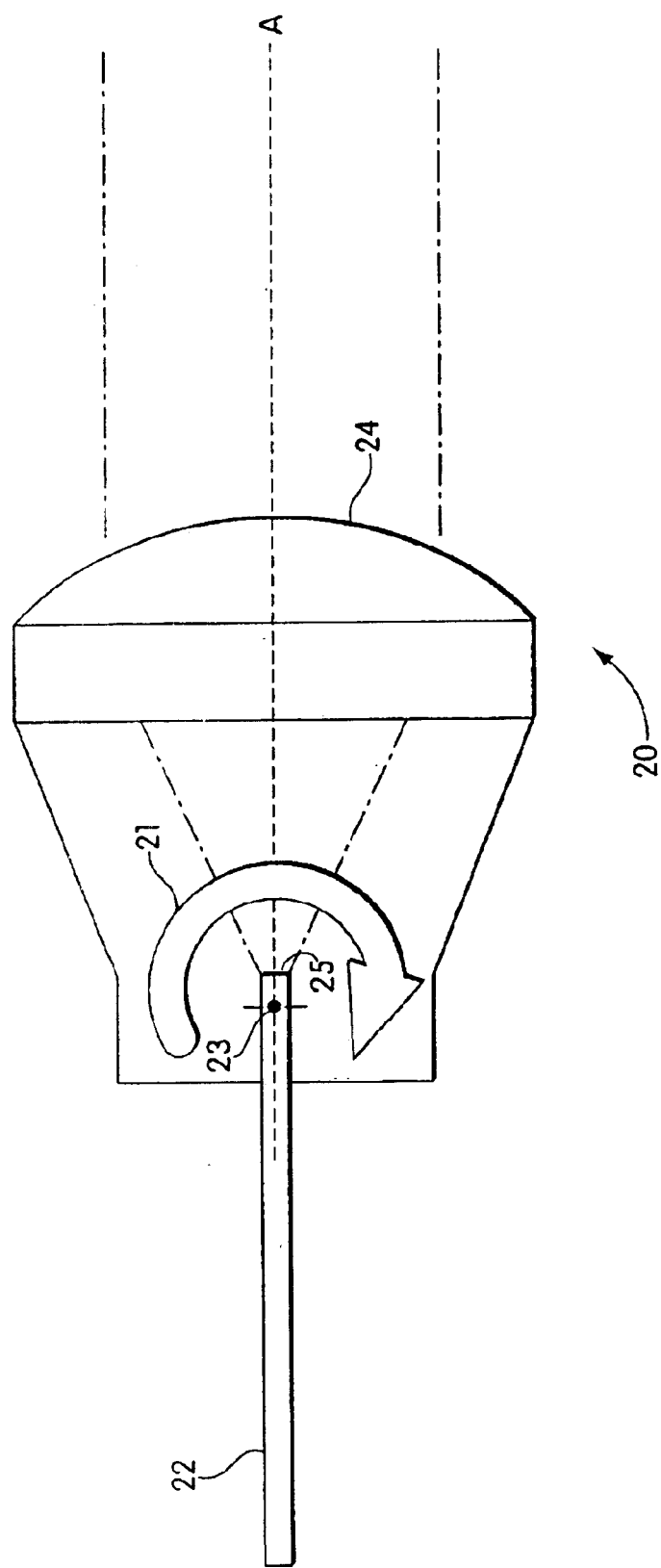
FIG. 2 shows a fiber/lens assembly with rotation for beam tilting.
Figure 3:
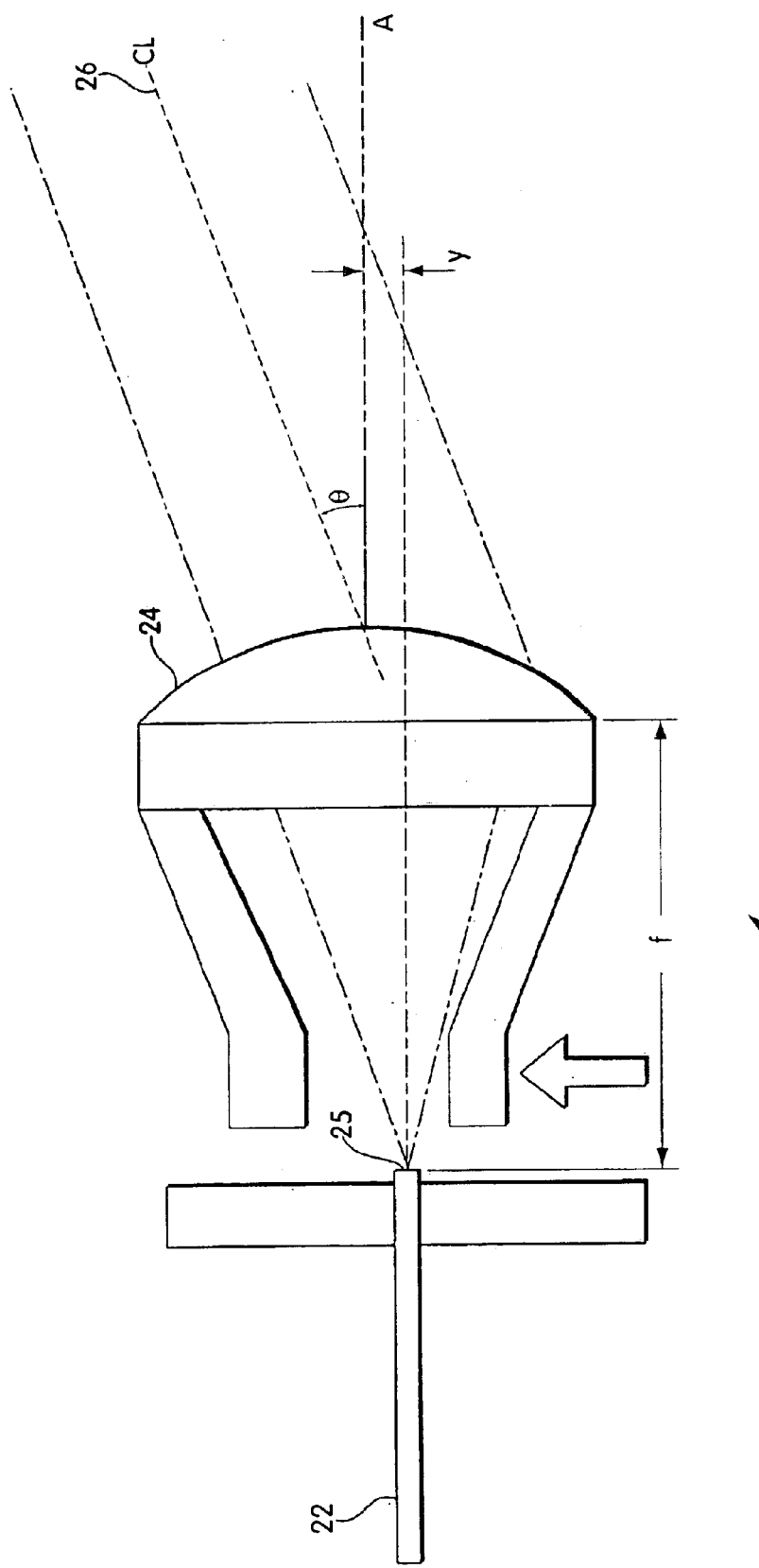
FIG. 3 shows a fiber/lens assembly with beam tilt achieved by moving a lens relative to a stationary fiber.

Referring now to FIGS. 2 to 5, the trajectory 26 of an optical beam emitted, for example, by an end 25 of an optical fiber 22 located in the focal plane of a collimator (lens) 24 and collimated by the collimator 24 relative to a fixed axis A can be adjusted with a fiber/lens assembly 20, 30, 40, 50 by different methods. As shown in FIG. 2, the fiber 22 can be secured to the collimator 24, and the fiber 22 and lens 24 can be tilted together about a pivot point 23, as indicated by arrow 21. The beam tilt angle is equal to the tilt angle of the fiber/lens assembly 20. The fiber tip can be cleaved at an angle and/or anti-reflection coated and/or lensed to reduce back reflections and/or improve optical performance. Alternatively, as depicted in FIG. 3, the lens 24 can be displaced a distance y relative to the stationary fiber tip 25 on the free end of the fiber 22 in a direction substantially perpendicular to the fixed axis A. The beam angle $\Theta$ in this embodiment is equal to $$\frac{-y}{f},$$

wherein f is the focal length of the lens. The first two approaches involve moving relatively heavy elements which tends to reduce the characteristic response/switching frequency. Those of skill in the art will understand that other optical elements, such as prisms and gratings, can also be displaced relative to an optical emitter/receiver element to effect beam steering.

Figure 4:
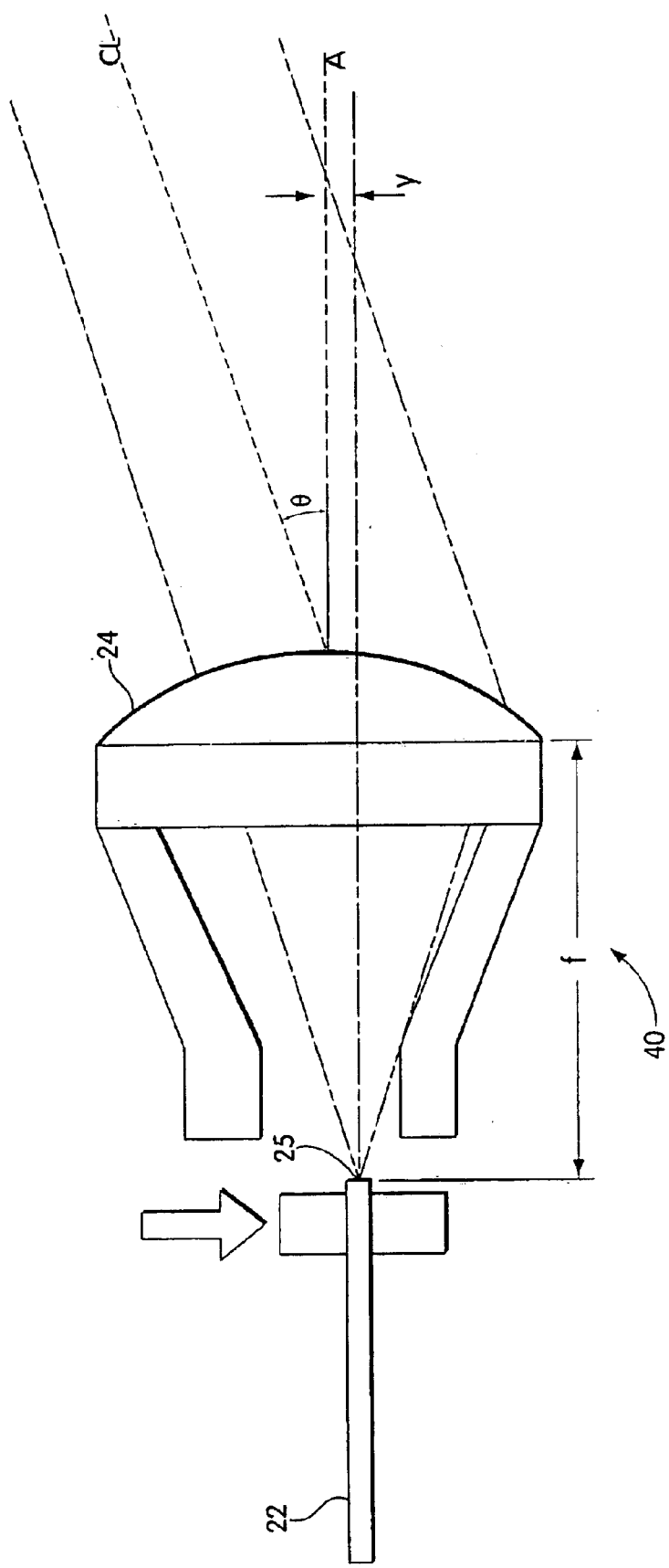
FIG. 4 shows a fiber/lens assembly with beam tilt achieved by moving a fiber relative to a stationary lens.

Conversely, as shown in FIG. 4, the fiber tip 25 can be displaced a distance y relative to the stationary lens 24, which also gives $$\Theta = \frac{-y}{f}.$$

Fiber translation requires displacement of the fiber by quite a large distance, depending on the focal length of the collimating lens and the desired deflection angle. Although the beam tilt angle $\Theta$ can be increased by using lenses with a shorter focal length to provide more "optical leverage", the required beam quality (wavefront distortion) for efficiently imaging the collimated beam onto the receiver 16, 18 sets lower limits for a practical focal length.

Figure 5:
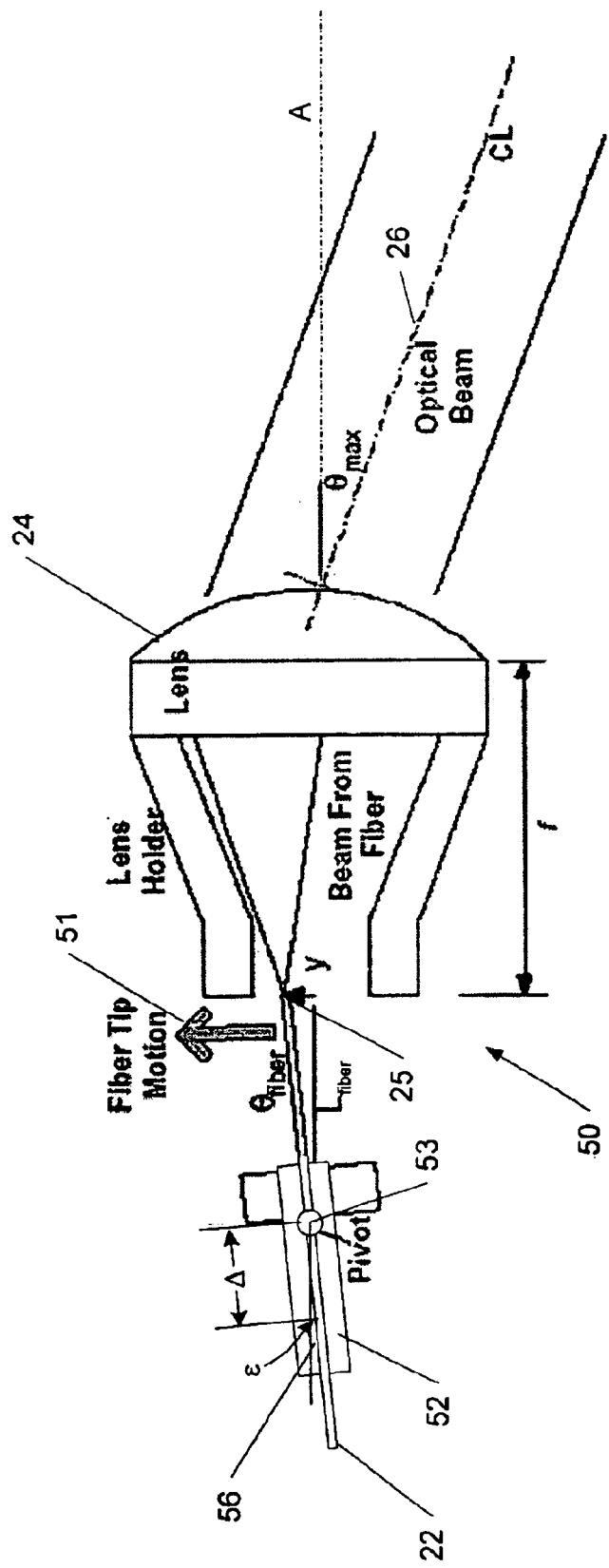
FIG. 5 shows a fiber/lens assembly with beam tilt achieved by rotating a fiber relative to a stationary lens.

An alternative beam steering/tilting mechanism 50 shown in FIG. 5 uses a holder or collet 52 holding the fiber 22 that can pivot about an "effective" pivot point 53. The term "effective" pivot point refers to the fact that the pivot point can move in relation to a stationary support depending on the tilt position of the holder 52. An actuator (not shown) can be connected to the holder 52 at attachment point 56 a distance $\Delta$ from the effective pivot point 53. The fiber acts as a lever arm to convert the angular motion into an amplified motion of the fiber tip on an arcuate path about the pivot point. For small rotation angles, the arcuate path can be viewed as being pseudo-linear, with the small deviations from a truly linear path correctable by an aspheric lens design. A lateral displacement $\epsilon$ of the attachment point from a rest position will displace the fiber tip 25 by y. The magnitude of y will in turn determine the beam angle $\Theta$, as discussed above. The last two approaches advantageously involve moving only the relatively light fiber.

Returning to FIG. 5, the beam tilt angle $\Theta$ is related to the lateral displacement y of the fiber tip 25 from its rest position by:

$$\Theta_{max} = \frac{-y}{f},$$

wherein f is the focal length of the lens. y is related to the lateral excursion $\epsilon$ at the attachment point 56 by the equation:

$$y = \frac{L}{\Delta} * \epsilon,$$

wherein L is the distance of the fiber tip 25 from the pivot point 53 of the fiber holder, $\Delta$ is the distance between the attachment point 56 on the fiber holder and the pivot point 53, and $\epsilon$ is the lateral displacement of the fiber holder at the attachment point 56.

Accordingly, $$\Theta = -\frac{L_{Fiber}}{f} * \frac{\epsilon}{\Delta}$$

i.e., the beam angle $\Theta$ can be increased by increasing the length of the free end of the fiber ($L_{Fiber}$) (which is impractical above a certain fiber length due to inherent flexing of the fiber); increasing the achievable actuator motion ("stroke") of the piezoelectric actuator or attaching a passive lever arm to the actuator (which has certain disadvantages discussed above); and/or by decreasing the distance $\Delta$ between the attachment point 56 and the pivot point 53.

With modern MEMS fabrication techniques, $\Delta$ can be reduced to a length of several tens of micrometers or less. A typical piezoelectric actuator can generate a stroke of $\epsilon$=10

μm, so that a tilt angle Θ~3° be obtained with Δ~60 μm. Tilt assemblies with such attachment point to pivot point spacing can be easily fabricated using MEMS technology. Motion transformers of two different designs will now be described.

Figure 6:
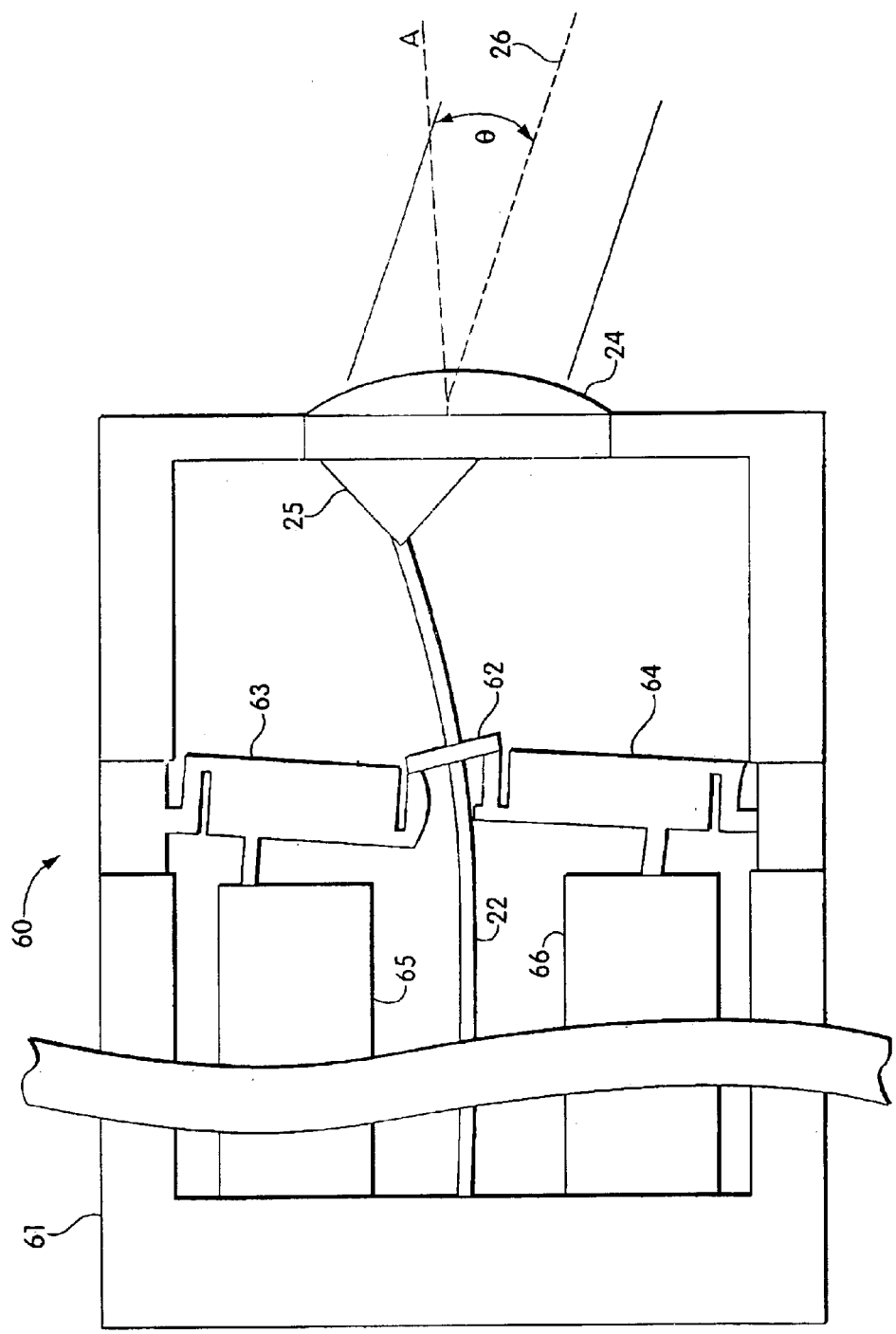
FIG. 6 shows schematically an embodiment of a motion transformer using the fiber/lens assembly of FIG. 5.

FIG. 6 depicts schematically a motion transformer 60 that transforms a linear (left-to-right) motion of the piezoelectric actuators 65, 66 into an (up/down) motion of optical fiber tip 25 located in the focal plane of a collimator lens 24 that is attached to a housing or support structure 61. The piezoelectric actuators 65, 66 are supported on a fixed end by the housing 61, with the free end of the piezoelectric actuators 65, 66 pushing against corresponding levers 63, 64 at attachment points 67, 68. The levers have flexures and are attached with one end to the support structure 61 and with the other free end to a holder/collet 62 that holds the fiber 22. As described above with reference to FIG. 5, the up-and-down motion of fiber tip behind the lens changes the trajectory and the beam angle Θ of the collimated beam.

Referring now to FIGS. 7A to 7F, the design of the lever arms of the motion transformer amplification mechanism determines the mechanical function, range of motion, amplification factor, and required forces. In the exemplary embodiment of FIG. 7A, a lever mechanism 70A includes three lever arms 73, 74, 75 that are spaced apart by 120° around the central fiber/lens optical axis 71. Three piezoelectric actuators (not shown) are coupled to the lever arms 73, 74, 75 at an attachment point 76 that is close to a lever arm's pivot (or flexing) point 771 where the lever arms are attached to the support structure 78, for example, a Si layer. The lever mechanism amplifies the linear motion of the piezoelectric actuators and converts the amplified linear motion into a tilt motion of the fiber. Hence any small deflection applied by a piezoelectric actuator, for example, to the lever arm 73 at the attachment point 76 is magnified by the ratio of the length of the lever arm to the distance between the attachment point and the attachment point to the support structure 78. A lever mechanism of this type can also be viewed as a stroke amplifier. The three arms 73, 74, 75 can be connected at their free ends by a common center structure, e.g., the fiber collet 72 that holds the optical fiber.

Figure 7A:
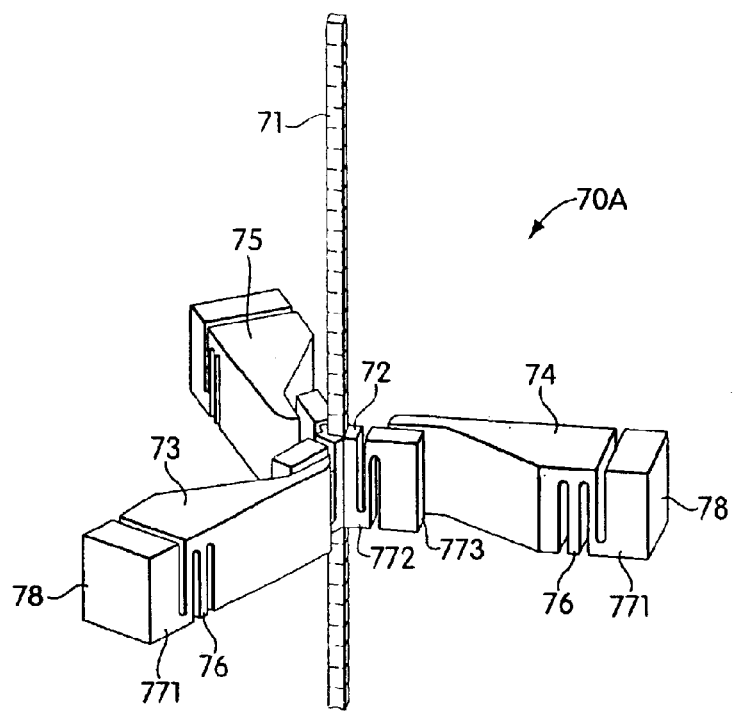
FIG. 7A is a perspective view of a first embodiment of an exemplary unitary lever arm for the motion transformer of FIG. 6 in a rest position.

In the exemplary embodiment shown in FIG. 7A, each of the three lever arms 73, 74, 75 has three independent flexure elements 771, 772 and 773. Two of the three flexures 771, 772 serve strictly as lever pivot bending points allowing each lever arm to amplify translational motion of the piezoelectric actuator. The third flexure 773 in each lever arm is oriented perpendicular to the other two flexures. This third flexure allows bending in a direction perpendicular to the other two flexures. Since the three lever arms 73, 74, 75 can be coupled through the center fiber/lens structure and the lever arms can be actuated independently, each lever arm is subjected to coupled motion and bending from another lever arm. The third flexure 773 provides compliance for this motion, which generates the angular tilt. Actuating each of the levers independently controls the position of three points of the center fiber/lens structure plane. Controlling three points of the fiber/lens plane provides the ability to position the fiber/lens, and therefore the optical beam, at any angle desired within the constraints of mechanical stops built into the layer structure.

Figure 7B:
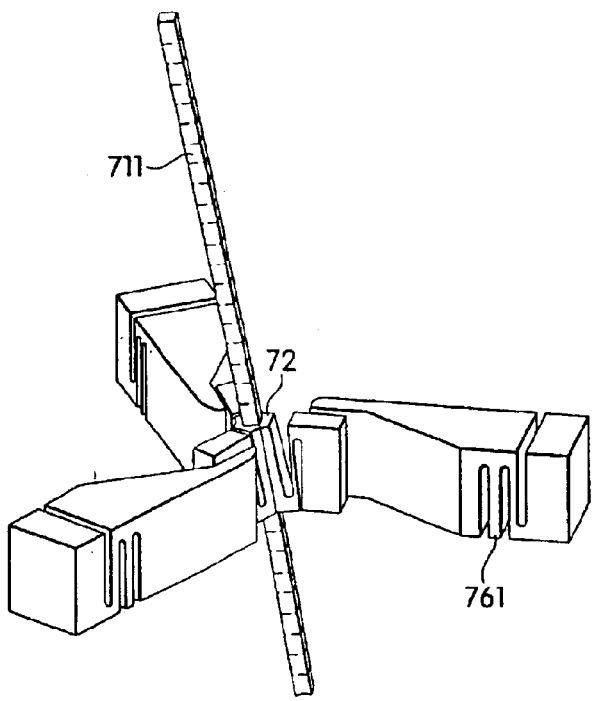
FIG. 7B is a perspective view of the lever arm of FIG. 7A in an actuated position.

FIG. 7B shows the mechanism of FIG. 7A in an actuated state, for example, by pushing against attachment point 76'. The fiber tilt 71' is determined by the difference in the excursion between the lever arms 73, 74, 75.

The exemplary lever arm structure 70A can be manufactured from a commercially available silicon wafer. Each of the lever arms is between 1 and 2 mm long. Other typical dimensions of the exemplary lever arm structure 70 are as follows:

Si wafer thickness=625 μm
Trench width=70 μm
Trench depth=545 μm
Flexure arm width=30 μm
Push point width=70 μm
Fiber hole diameter=140–190 μm With these dimensions and the positions of the actuator push points shown in the exemplary design, a translational motion amplification of about a factor of five (5×) can be easily achieved at the center of the fiber attachment structure. As mentioned above, the tilt action is produced by differentially energizing the actuators.

Figure 7C:
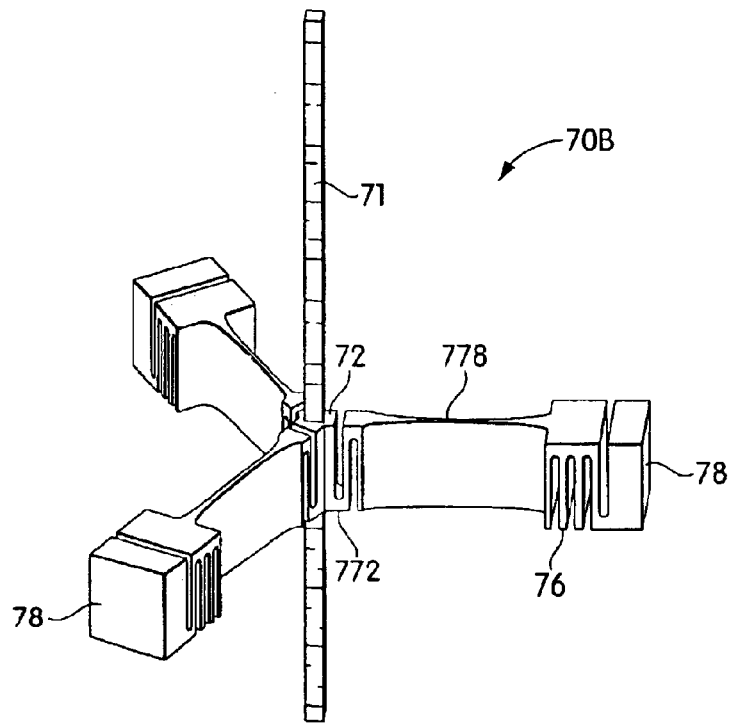
FIG. 7C is a perspective view of a second embodiment of an exemplary unitary lever arm for the motion transformer of FIG. 6 in a rest position.
Figure 7D:
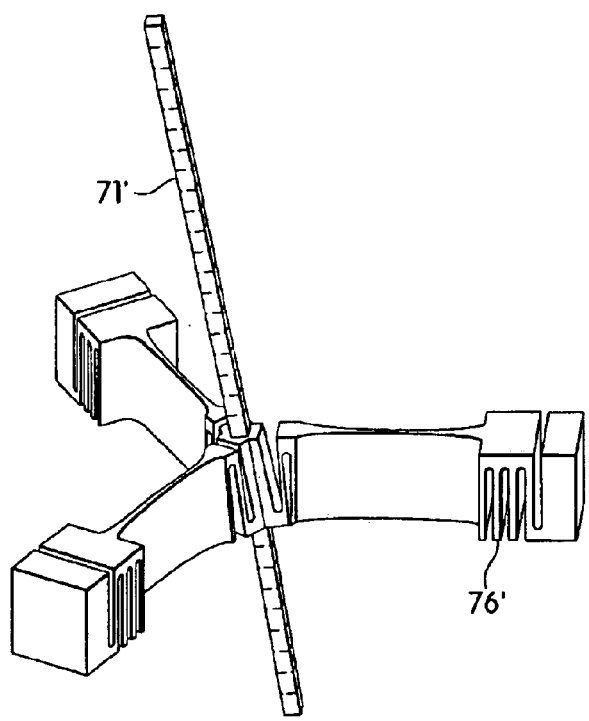
FIG. 7D is a perspective view of the lever arm of FIG. 7C in an actuated position.

FIG. 7C depicts another embodiment 70B of the lever arm mechanism wherein the flexure 773 has been replaced with a thin arm 778 that absorb the torsion forces produced by the other lever arms. The arm(s) can then twist, as shown in FIG. 7D when the lever arm is actuated at attachment point 76'.

Figure 7E:
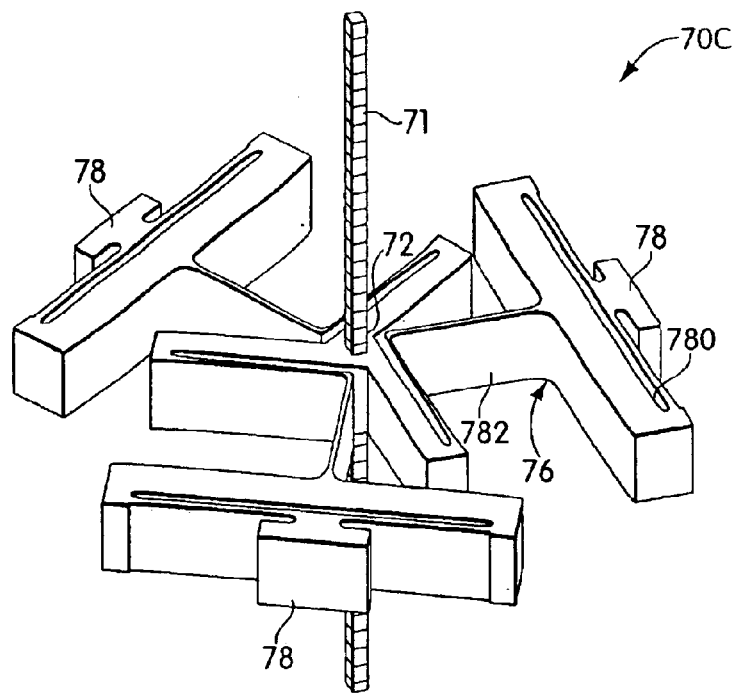
FIG. 7E is a perspective view of a third embodiment of an exemplary unitary lever arm for the motion transformer of FIG. 6 in a rest position.
Figure 7F:
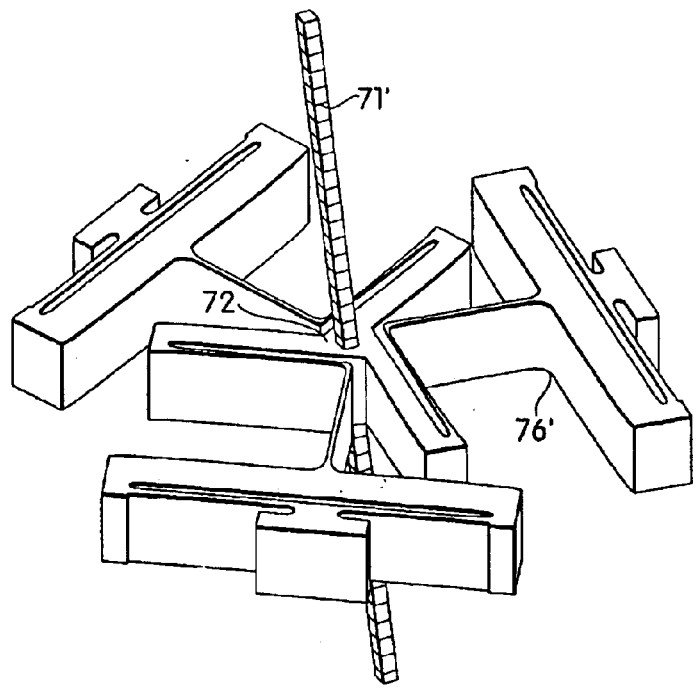
FIG. 7F is a perspective view of the lever arm of FIG. 7E in an actuated position.

FIG. 7E depicts yet another embodiment 70B of the lever arm mechanism wherein the flexures 780, 782 and 784 are formed by etching through the entire wafer thickness rather than to a certain trench depth which has to be carefully monitored, which simplifies the manufacturing process. The attachment point 76 of the actuators is located proximate to the stationary support 78, as in the embodiments described above with reference to FIGS. 7A to 7D. As shown in FIG. 7F, the fiber and/or beam direction tilts when the lever arm is actuated at attachment point 76'.

Other designs of actuation mechanisms can have at least one arm, two arms, and potentially four or more arms. In general, symmetrical designs like the three-arm described above are preferred because they are insensitive to a thermal expansion mismatch between the arms and the housing and because they provide for high angular output due to the capability for differential actuation. Different modes of motion (translation, plunge, etc.) can be achieved by different linkage designs.

Like in the embodiment depicted in FIG. 5, the effective pivot point for the angular motion lies within the length of the fiber holder. With the dimensions shown, about a ±3° angular swing can be achieved in this structure for about 5 μm of translational motion of any one of the piezoelectric actuators, independently actuated, at the attachment point 76.

In order to maximize the amplification and tilt motion, the flexures should have a high stiffness in the direction of the actuation force, while allowing the holder to tilt freely. This can be accomplished with the flexure 773 of the three-jointed hinge mechanism of FIG. 7A or alternatively with the thin vertical flexures 778, 782 of FIGS. 7C and 7E. This mechanism can also be understood as a compliant actuation mechanism or gimbal allowing free angular movement, such as tilting over a solid angle, of the holder. In general, making the flexure elements long and thin in cross section will provide more compliance and reduce the stress the flexures undergo. However, in a practical switch application, this would increase the overall radial dimension of each port in the switch fabric, which would disadvantageously also increase the center-to-center spacing between ports and the required beam steering angle.

Unlike the embodiments illustrated in FIGS. 7A to 7F which employ several linear piezoelectric actuators for each fiber port, an amplified tilt motion can also be obtained by using a single bending-type piezoelectric actuator that bends along its longitudinal (z) axis. The detailed design of an embodiment using double-membrane flexures will now be described with reference to FIGS. 8 to 10.

Figure 8:
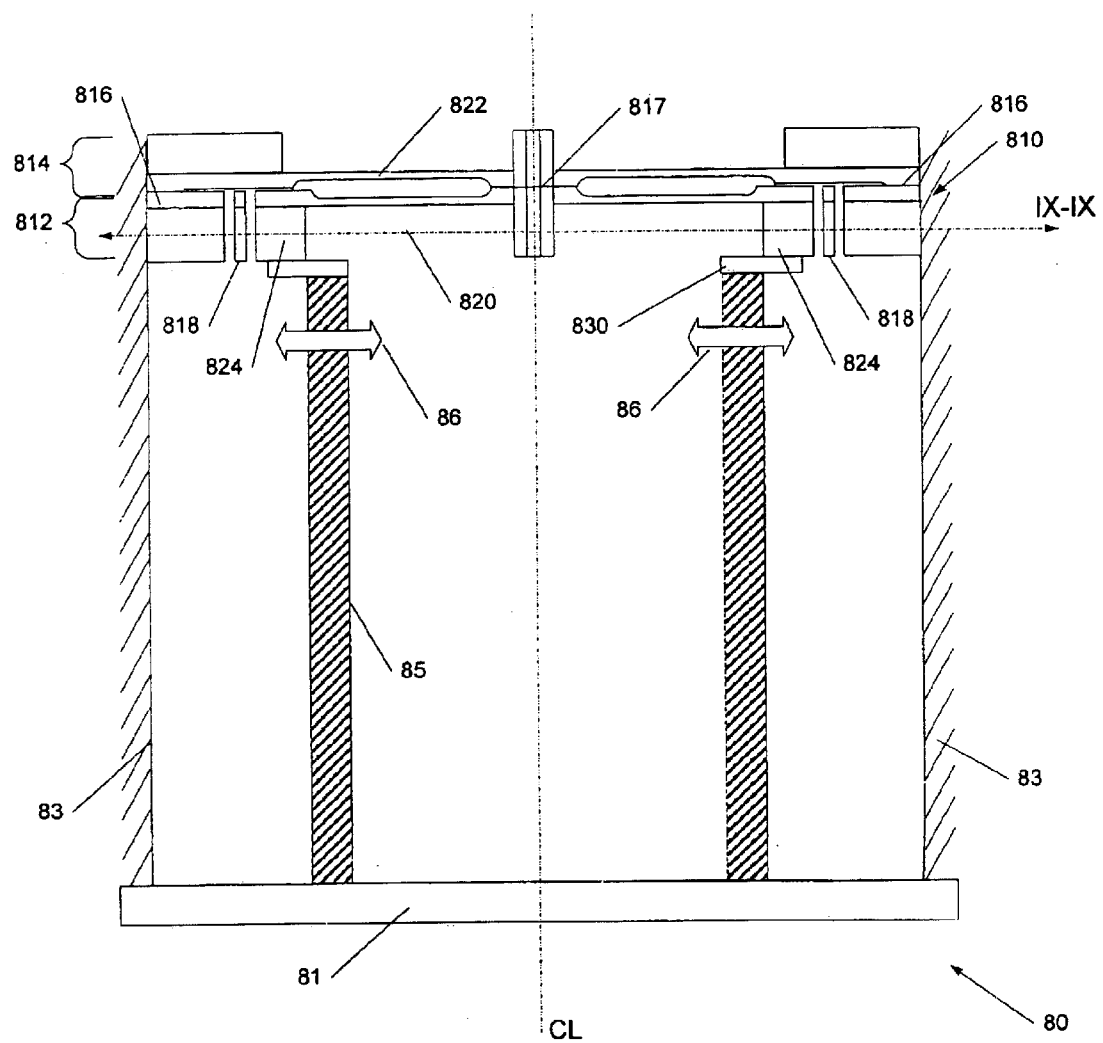
FIG. 8 shows schematically in cross-section another embodiment of a motion transformer using a double-membrane flexure and the fiber/lens assembly of FIG. 5.

FIG. 8 is a cross-sectional view of a motion transformer mechanism 80 with a piezoelectric bending actuator 85 that is supported on the bottom support 81 of a housing or support structure having side walls 83. Various designs for the piezoelectric actuator 85 and the electrode arrangement will be discussed in more detail below. Upon actuation by an electrical charge and/or voltage, the free end of the piezoelectric actuator 85 moves sideways in the direction of arrows 86. A double-membrane flexure 810 is supported laterally by the side walls 83. The double-membrane flexure 810 is fabricated of two separate layers 812 and 814 that are bonded together along at least a portion of their periphery 816 and at the center 817. It will be understood by those skilled in the art that various other optical elements, such as a lens, a mirror and/or an optical grating may be attached to the motion transformer.

In the illustrated embodiment, the double-membrane flexure 810 is made of silicon or silicon-on-insulator (SOI) wafers, but other materials, such as metals, can also be used. A thin annular membrane 820, 822 is located between the bonded sections 816 and 817 in the plane of each layer 812, 814. The membranes can be continuous or segmented. The radially inward portion of the upper membrane 822 is attached to the fiber holder 82, whereas the radially outward portion of the upper membrane 822 is fixedly secured to the wall 83. The radially inward portion of the lower membrane 820 is attached to the fiber holder 82, whereas the radially outward portion of the lower membrane 820 is connected to an annular ring 824 that is resiliently supported for movement in the direction of the arrows 86 by flexures 818 disposed between the annular ring 824 and the portion 826 of the layer 812 that is fixedly secured to the wall 83. An additional optional annular structure 830 can be disposed between the free end of the piezoelectric actuator 85 and the resiliently supported ring 824 to accommodate fabrication tolerances when connecting the free end of the piezoelectric actuator 85 to the ring 824. The compliant upper membrane can also be viewed as a gimbal mount for the holder 82.

Figure 9:
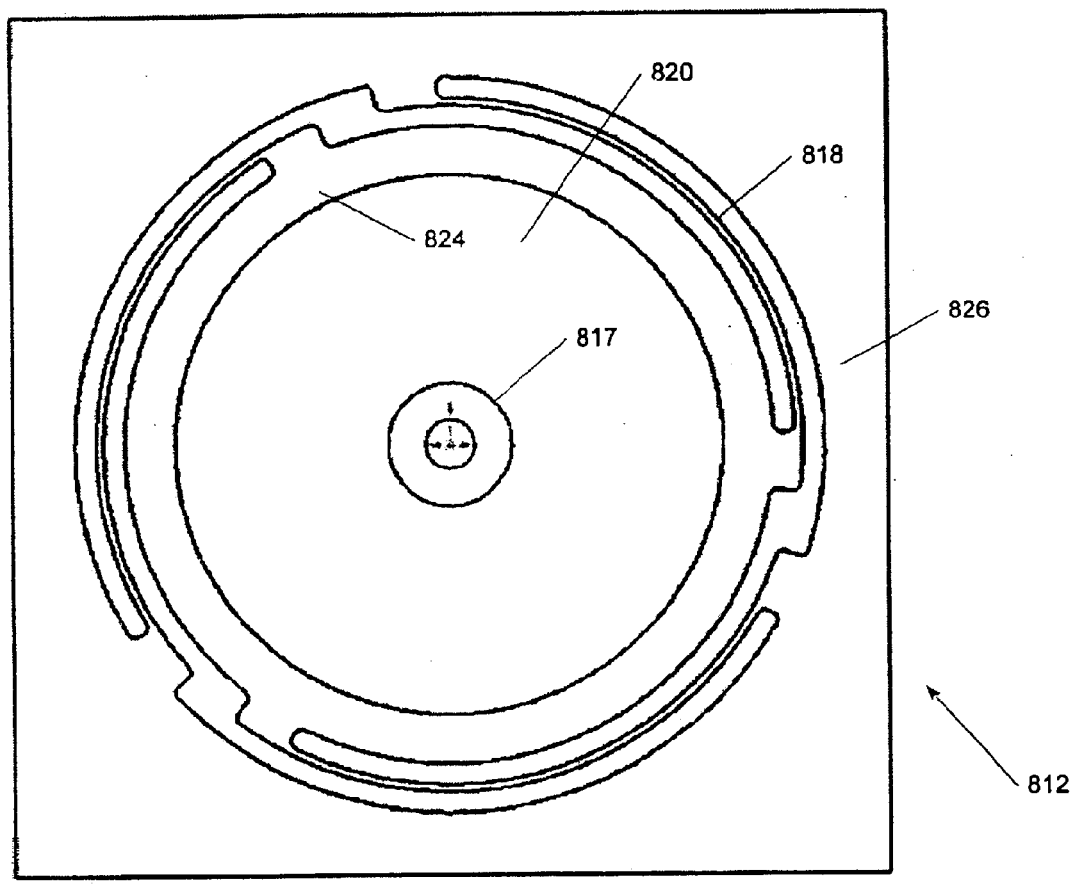
FIG. 9 is a cross-sectional bottom view of the motion transformer taken along the line IX—IX of FIG. 8.

FIG. 9 is a cross-sectional view, viewed from the bottom 81, of the double membrane flexure motion transformer taken along the line IX—IX of FIG. 8. In the depicted exemplary embodiment, three flexures 818 are arranged between and connecting the annular ring 824 and the fixed portion 826 of the layer 812 to allow essentially uniform lateral displacement of the annular ring 824 for all actuation directions of the free end of piezoelectric actuator 85. These flexures 818 are not required for ultimate function of the device. They are designed to be compliant so as to maintain position of the ring until it is bonded to the actuator and to not reduce performance of the device during operation.

Figure 10:
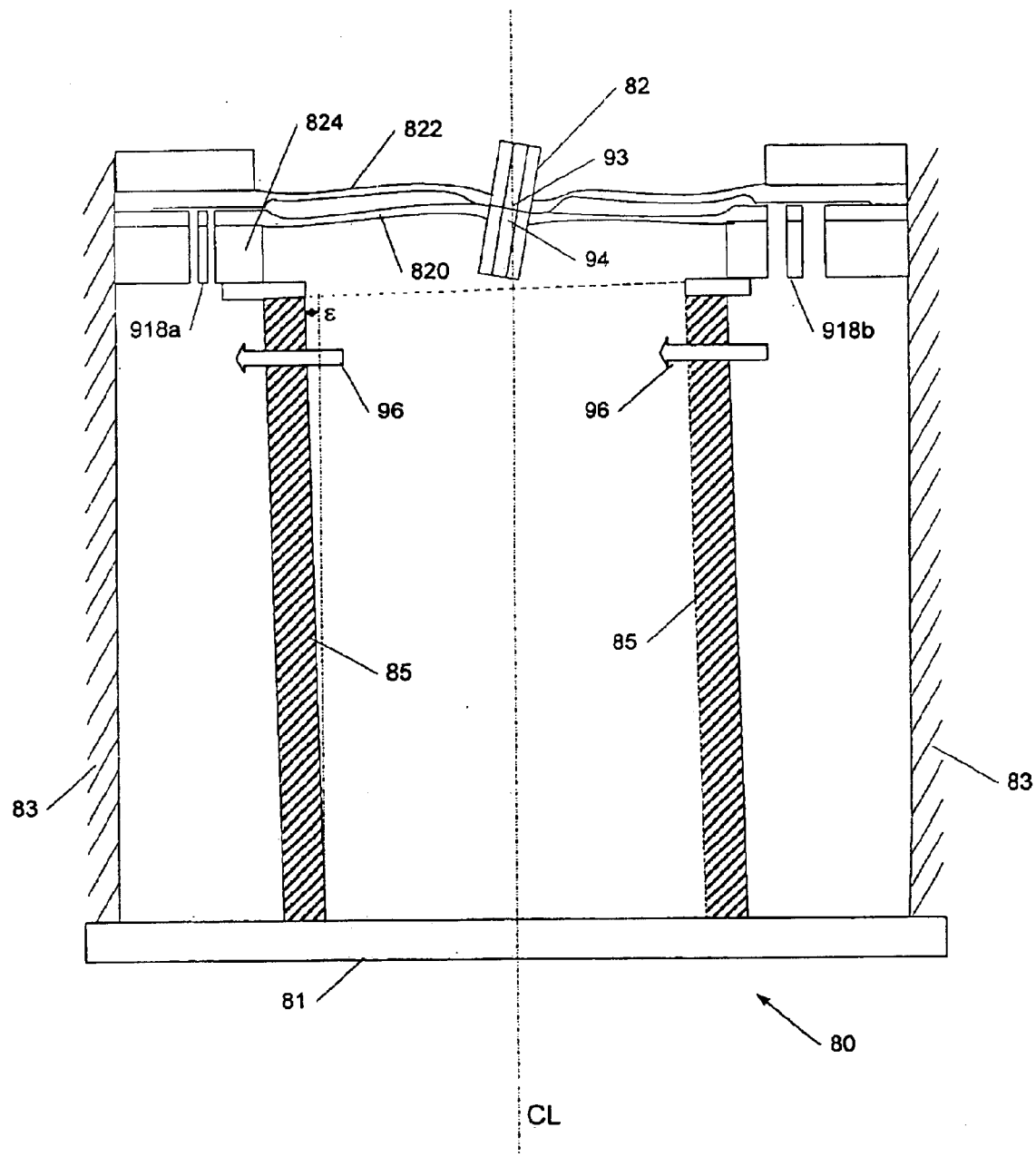
FIG. 10 shows the motion transformer of FIG. 8 in an actuated state.

FIG. 10 shows the motion transformer mechanism 80 in an activated state, with the free end of piezoelectric actuator 85 laterally displaced by a distance $\epsilon$ in the direction of the arrows 96. This displacement $\epsilon$ urges the annular ring 824 towards the left section of wall 83 by compressing flexure 918a and away from the right section of wall 83 by expanding the flexure 918b. As a result, a force is applied to the attachment point 94 of the lower membrane 820 which pulls the attachment point 94 towards the compressed flexure 918a and thereby pivots the fiber holder 82 about the essentially stationary pivot point 93 of the holder 82. This pivoting motion of the fiber holder 82 causes the trajectory of a beam emitted by a fiber tip (not shown) to be changed by an angle $\Theta$, as described above with reference to FIG. 5. The membranes can be manufactured very precisely by MEMS technology, wherein a spacing between the attachment point 94 and the pivot point 93 of, for example, 50–100 $\mu$m can be easily achieved. A small displacement $\epsilon$ of the piezoelectric actuator 85, on the order of 5 $\mu$m, can then effect a large change in $\Theta$.

Figure 11:
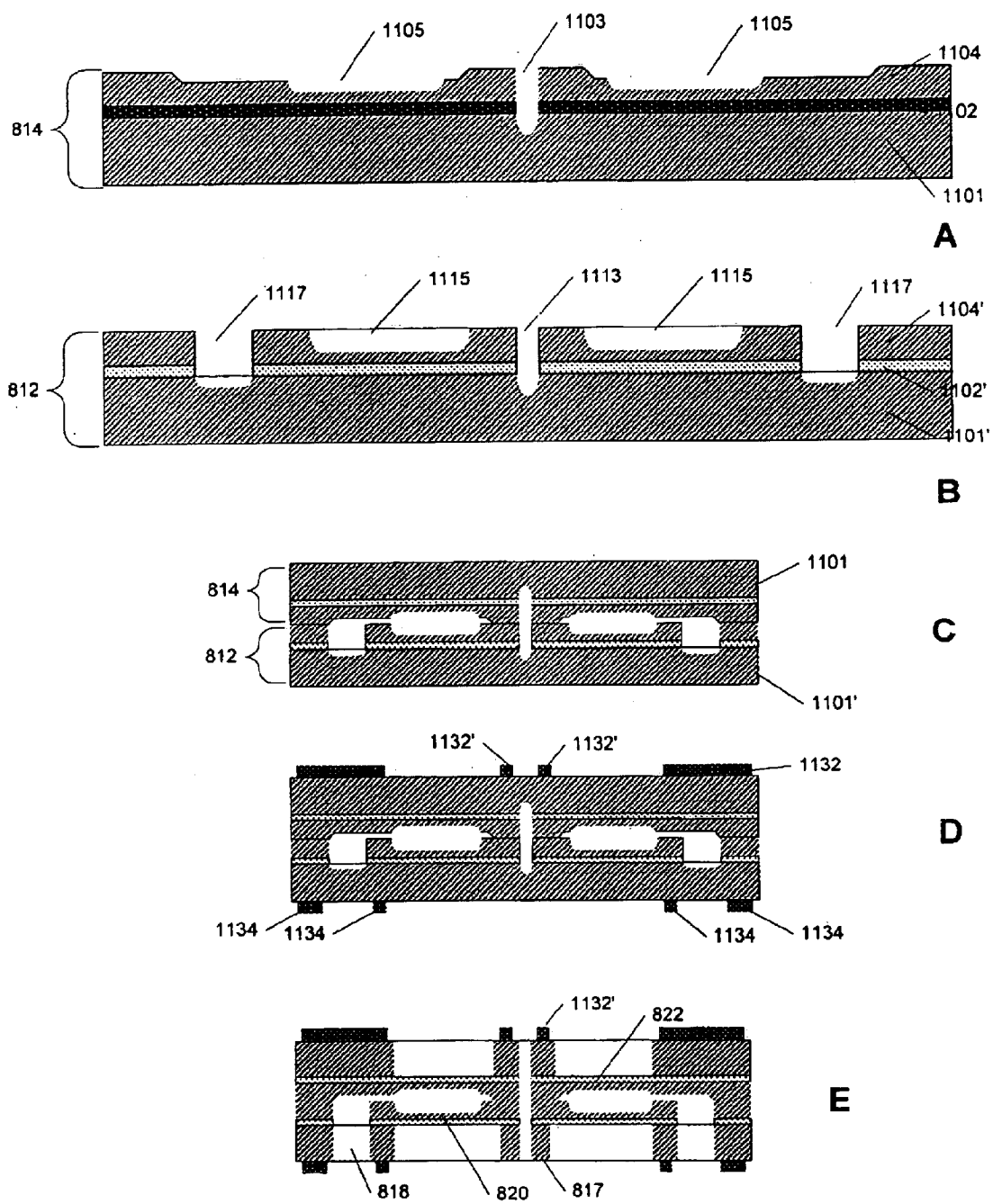
FIG. 11 depicts a process for fabricating the bonded double-membrane flexure of the motion transformer shown in FIGS. 8 to 10.

FIG. 11 illustrates the MEMS fabrication steps of double-membrane flexure 810. Precise control of the layer thickness, in particular of the thin membranes 820, 822, is made possible by using precisely engineered, commercially available SOI (silicon-on-insulator) wafers. A SOI wafer typically consists of a handle wafer to which a thin $SiO_2$—Si layer structure is wafer-bonded, with the $SiO_2$ layer facing the handle wafer. The thicknesses of both the Si and the $SiO_2$ layer can be well controlled, ranging from extremely thin (10 nm) to as thick as several tens of micrometers, with a thickness uniformity of better than ±5%. In the present embodiment, the handle wafer provides structural support, whereas the membranes are essentially formed from the thin Si layer.

Referring now to FIG. 11, and in particular to process step A, the top MEMS layer 814 is made of an SOI wafer with a Si layer thickness of 60 $\mu$m on the device side 1104. The Si layer 1104 is supported by a handle layer 1101 via an intermediate $SiO_2$ layer 1102. A stepped recess 1105 with a residual layer thickness of approximately 10 $\mu$m is etched on the device side 1104. This residual layer will later form the membrane 822. A center portion 1103 is etched through the Si device layer 1104 and the intermediate $SiO_2$ layer 1102 partially into the handle layer 1101.

The bottom MEMS layer 812 is etched in a separate process step B. Beginning with an SOI wafer having the same dimensions as the top wafer described above, a recess 1115 with a residual layer thickness of approximately 10 $\mu$m is etched on the device side 1104'. This residual layer will later form the membrane 820. A center portion 1113 and an annular portion 1117 are etched through the Si device layer 1104' and the intermediate $SiO_2$ layer 1102' partially into the handle layer 1101'.

In process step C, the bottom layer 812 is bonded, for example, by fusion or wafer bonding, to the top layer 814. In process step D, metallization layers 1132, 1132', 1134, and 1134' made, for example, of Ti/Pt/Au or Ti/Ni/Au are deposited and patterned on the respective handle surfaces 1101, 1101' of the bonded membrane layers. The metallization layers 1132 are provided for subsequent attachment of the formed double-membrane structure 810 to a holder or housing, whereas metallization layer 1132' is provided for attachment of the fiber extending through the center opening of collet 817. Metallization layer 1134' attaches, either directly or via an intermediate layer, to the piezoelectric actuator (not shown). In process step E, a DRIE etch is performed on both the top handle 1101 and the bottom handle 1101' of the bonded membrane layers to etch through the collet 817 and to the buried $SiO_2$ layer to form the two membranes 820 and 822, and the vertical flexures.

Figure 12:
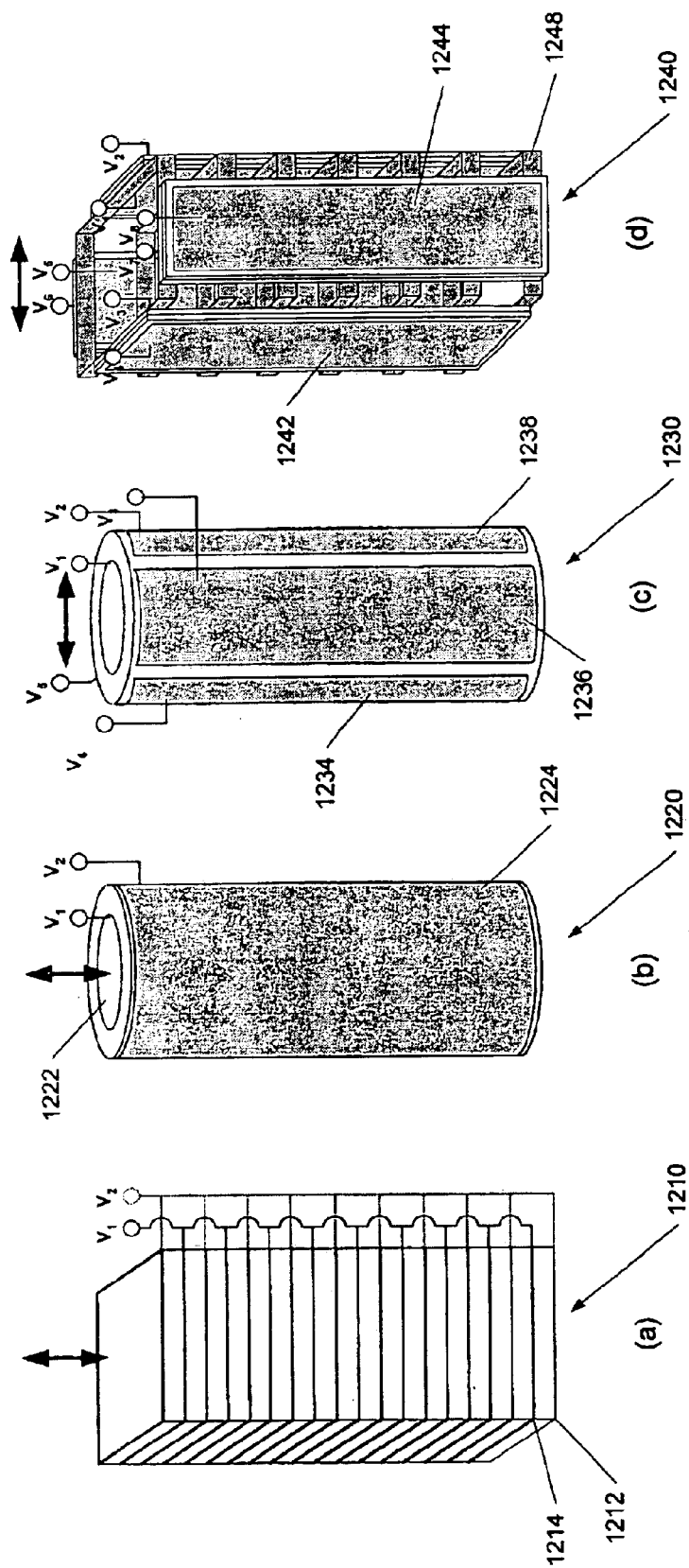
FIG. 12 depicts exemplary piezoelectric actuator configurations useful for the embodiments of FIGS. 7 to 10.

FIG. 12 shows different embodiments of piezoelectric actuators capable of providing the movement for the exemplary motion transformers described above. FIG. 12(a) shows a piezoelectric stack 1210 with sequentially arranged interdigitated electrodes 1212, 1214 which expands/contracts in the direction of the arrow upon application of an external voltage to the interdigitated electrodes 1212, 1214. FIG. 12(b) shows a piezoelectric tube 1220 with an inner electrode 1222 and an outer electrode 1224 which also expands/contracts in the direction of the arrow upon application of an external voltage to the electrodes 1222, 1224. FIG. 12(c) shows a tube 1230 with an inner electrode 1232 and segmented electrodes 1234, 1236, 1238 disposed of the outer surface of the tube 1230 along its longitudinal axis.

This tube can bend in the direction of the arrow upon application of different voltages between the inner electrode 1232 and the electrodes 1234, 1236, 1238. FIG. 12(*d*) shows an alternate embodiment of a piezoelectric bender 1240 having separately addressable piezoelectric bending elements 1242, 1244, . . . arranged on a support structure 1248. The piezoelectric tube can also be made of a material, for example, a metal tube, that is coated with a piezoelectric material.

The material compositions that produce the illustrated modes of operation are known in the art.

A tubular actuator of the type depicted in FIGS. 12(*c*) and (*d*) is particularly suited for the embodiment of FIGS. 8–10. The sideways motion is transferred by the double-membrane motion transformer 810 to the fiber collet 82.

Although the motion transformer and beam deflection mechanism has been described above with reference to a single unit, such devices can be conveniently integrated to form a multi-port switch fabric, which will now be described.

Figure 13A:
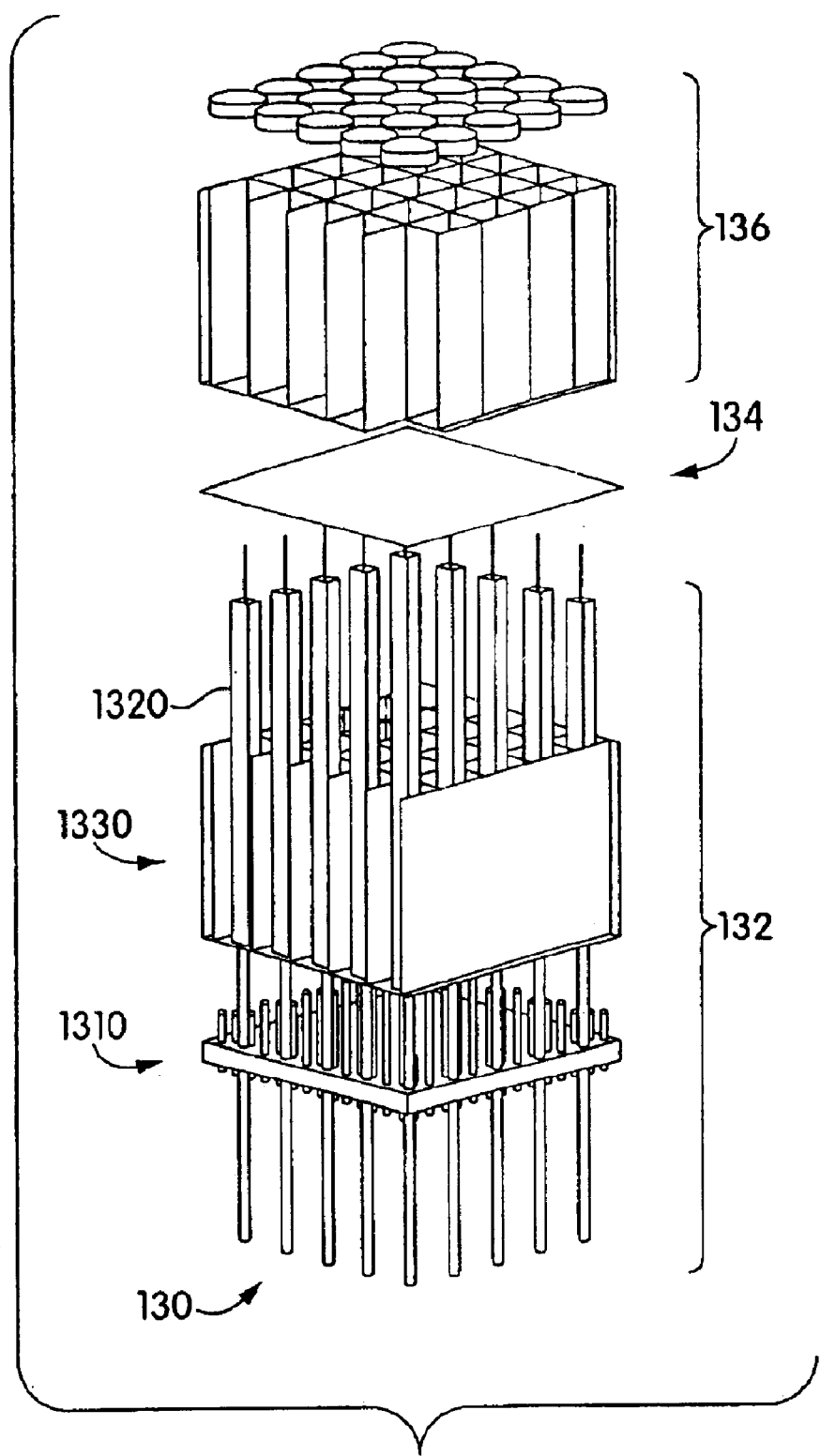
FIG. 13A is an exploded view of the layers/subassemblies forming the optical switch fabric of FIG. 1.

FIG. 13A shows an exploded view of an exemplary switch fabric 130 having multiple emitters/receivers that can be arranged in form of a two-dimensional array, as described above with reference to FIG. 1. The switch fabric 130 can be assembled from layered subassemblies, such as an actuator subassembly 132, a motion transformer subassembly 134 and a lens/collimator subassembly 136. Each part of the device can advantageously be independently tested and its performance verified before final mating, thereby increasing the overall process yield.

An actuator sub-assembly 132 includes a base layer 1310, actuators 1320 and a spacer (housing) layer 1330. The base layer 1310 forms the support layer for the piezoelectric actuators. The base layer 1310 can include seating surfaces for the piezoelectric actuators, holes for the optical fiber, and holes for the electrical connections to the actuators. This layer should be stiff to provide support for the actuators and can be made, for example, of a silicon-on-insulator (SOI) wafer, or a multi-layer ceramic. Alternatively, a multi-chip module substrate commonly used in electrical chip technologies can be employed. Wafer level electrical components, such as switches and transistors, for electrically connecting and/or addressing the individual actuators can also be incorporated.

As described above, the embodiment described above with reference to FIGS. 6 and 7A to 7F and using the linear actuator motion transformer has preferably three piezoelectric actuators per optical port, while the dual-membrane flexure motion transformer of FIGS. 8–10 requires only a single piezoelectric actuator (FIG. 12(*c*)) or actuator assembly (FIG. 12(*d*)) per optical port. The actuators 1320 are located in holes extending through the spacer layer 1330 and formed by a number of drilling or milling processes known in the art, including laser beam machining and ultrasonic abrasive milling. The spacer layer 1330 layer can provide additional structural and spacer support for precisely locating the actuators relative to the amplification mechanism and the fiber/lens and also provides structural support, such as the wall 83 of FIG. 8, for the actuators to react against. The actuators are piezoelectric, electrostrictive, thermal, or magnetostrictive in composition or any of a variety of other actuators known in the art, and can optionally be capped on their free ends to facilitate interfacing with a layer above. The spacer material has a thickness comparable to the actuator length (in the present embodiments approximately 10 to 11 mm) and can be, for example, PYREX glass or a ceramic material to achieve optimal thermal expansion matching with the piezoelectric actuator(s). The holes should be oriented and arranged so as to place the beam ports as close together as possible to allow close-packed arrays of beam ports in a fiber optic beam steering switch application. A center-to-center spacing or pitch of the beam ports of 1–4 mm can be easily achieved with commercially available piezoelectric actuators having diameters of 2.2 mm or less. The thickness of the spacer layer is in part determined by desired and available amounts of strain or throw from the actuators for a given drive voltage. Both layer 1310 and 1330 should be configured to provide a high stiffness load return path to react the loads at the base of the actuators to the motion transformation stage 134. Any compliance in layers 1310 and 1330 tends to diminish the actuation and motion capability of the completed assembly.

The second sub-assembly 134, the motion transformer sub-assembly, includes a single or plurality of layers which together accomplish the tasks of attaching to and causing articulation of the moving optical element in the beam steering unit based on relative motion between the electroactive actuator element and the housing or based on relative motion between two or more actuator elements. The sub-assembly 134 has a mating interface on its lower side which allow for imprecise positioning onto the piezo actuators 1320 and housing/spacer 1330. The subassembly also has a mating interface on its top surface allowing positioning and attachment of the moving elements of the optical subassembly 136.

The layers comprising subassembly 134 can be made, for example, of a micro-machined (MEMS) Silicon-On-Insulator (SOI) wafer and can include a push point beam or the annular ring 824 (FIG. 8) that can be bonded directly to the etched mechanisms on other layers in the subassembly. The subassembly 134 and or its constituent layers can be used to route signals to the piezo actuators, for example in a row/column addressing scheme in which row address lines could run on layer 1310 and column address lines could run on the bottom surface of subassembly 134. Furthermore, sensors such as piezoresistive, piezoelectric, or capacitive sensors, could also be incorporated into subassembly 134 to allow sensing and feedback for accurately positioning and controlling the actuator.

Subassembly 134 is the primary motion transformer subassembly which includes layers containing the lever arm structures 70A, 70B, 70C (FIGS. 7A–7F) or the flexure membrane structure 810 (FIG. 8) with the fiber holder described earlier. The mechanism converts the vertical elongation/lateral bending motion of the piezoelectric actuators into an angular tilt of the fiber (and optionally) lens for controlling the beam trajectory. Alternatively, the subassembly can include a layer or portion thereof which can also be coupled to the fiber/lens tilting mechanism depicted in FIG. 2.

As mentioned before, layers comprising subassembly 134 can be formed by a series of deposition and etch processes (wet etching, DRIE) on both sides of a Si or Si—SiO$_2$—Si wafer to form the resilient flexures (either lever beams or membranes), with careful control of the front-to-back alignment of the masks. Side wall straightness and fillet control at the bottom of the trenches is also important for achieving the desired strength and fatigue-resistance of the structure. The formations of the layer(s) and their subsequent assembly into a unified subassembly can be accomplished by a wide variety of processes including but not limited to those commonly used in the fabrication and assembly of micro-electro-mechanical systems (MEMS). These can include DRIE and/or KOH wet etching processes as well as SI—SI wafer bonding and/or thermocompression wafer or die bonds using gold and or other metal interlayers. Alternately, the layers comprising the subassembly can be individually fabricated and mechanically joined and held together during overall device assembly and operation.

Sub-assembly 134 can also include layers or portions of layers which serve the primary mating function with the moving optical element, for example providing features for mating to and/or holding or bonding a moving optical element such as: a fiber, a lens, pre-assembled fiber/lens assembly, a fiber with integrally lensed tip, a prism, an optical wavelength filter element, or grating element. For example, the lens and fiber could be assembled together and bonded directly to a portion of the layers comprising sub-assembly 134, similar to the fiber/lens arrangement of FIG. 2.

It will be understood by those skilled in the art that various other optical elements, such as a lens, a mirror and/or an optical grating may be attached to the motion transformer.

The actuator subassembly 132 and the amplifier subassembly 134 can be solder-bonded using a solder having a melting/process temperature that is lower than the temperature used to assemble the actuator subassembly and also less than the Curie temperature of the piezoelectric actuator material, or an organic adhesive (e.g. an epoxy or cyanate ester). Additionally, an anodic bonding process can be used to form the bond. Alternatively, an ultraviolet cured epoxy may be used. The fiber/lens assembly 136 can be joined to layer 134 in a similar manner. The actuators should be mechanically preloaded so as to prevent them from going into tension. This can be accomplished by placing a small load (<0.5 N) on the fiber. An organic adhesive, for example, a UV curable adhesive, can be used to bond the fiber under preload to the bottom of layer 1310 and seal the layer.

The assembly 130 can optionally be placed in a windowed hermetically sealed package. Temperature control can be provided using heaters or Peltier thermoelectric devices within the package if this is required for stabilization over the operating temperature range. A hermetic header with hermetic lead feedthroughs and seam-sealed lid can be used to enclose the free-space optical path in an inert dry atmosphere. This excludes particles, prevents condensation on the optical surfaces, contributes to the reliability of the bare fibers bending within the package, and controls the atmosphere for the piezoelectric material as well.

Figure 13B:
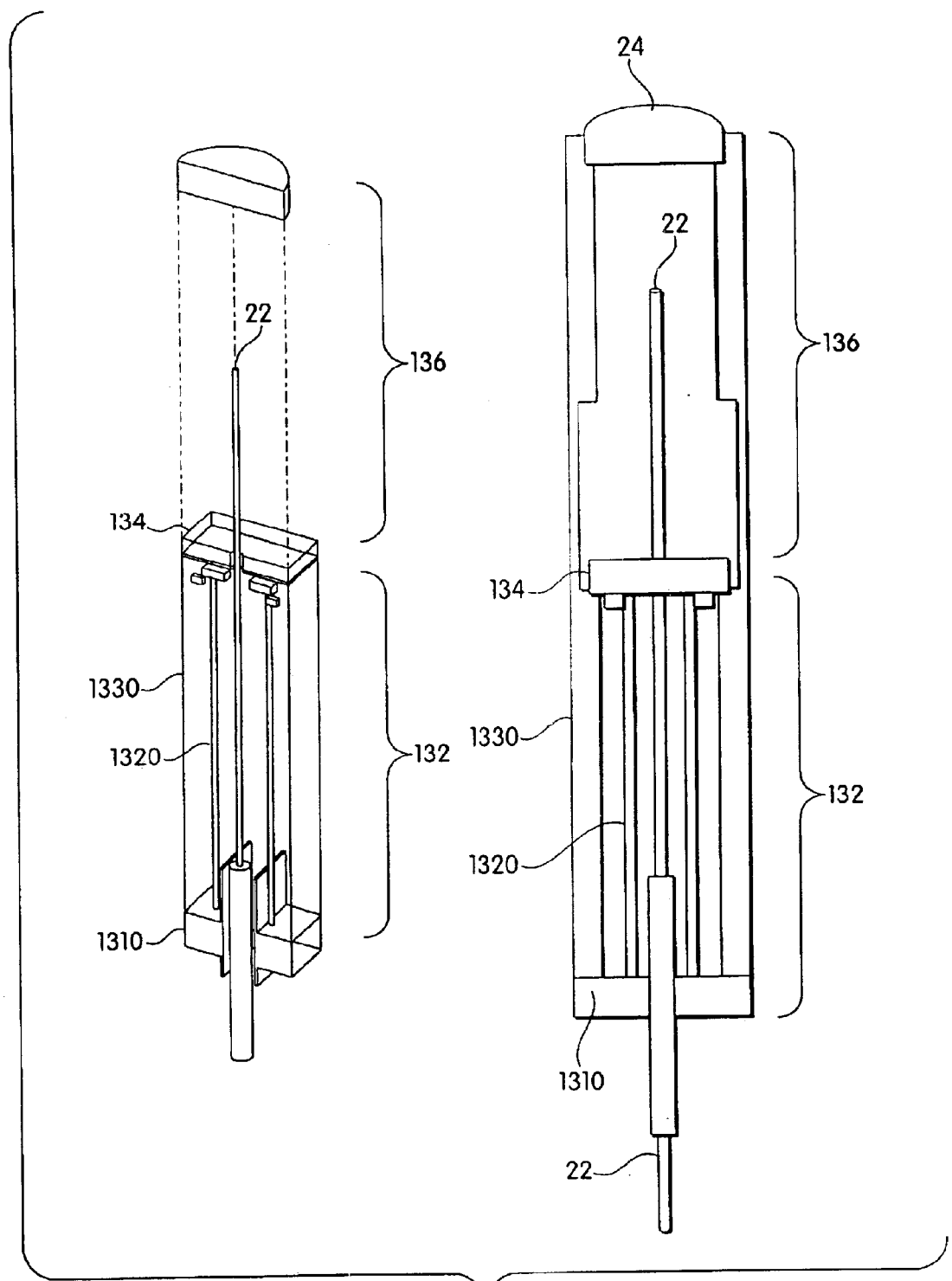
FIG. 13B is a perspective view (a) and a cross-sectional view (b) of an individual unit-cell, which together with other unit cells can form the optical switch fabric of FIG. 13A.

FIG. 13B shows an individual unit-cell of the switch fabric depicted in FIG. 13A. These individual cells or subassemblies formed of multiple cells can be assembled into a larger switch fabric with a greater port count. The various layers and elements of the individual unit-cell that correspond to the layers/subassemblies of FIG. 13A are referenced with identical reference numerals.

Each fiber/lens assembly needs to be carefully collimated for optimizing the optical emitter-to-receiver coupling efficiency. This can be done by observing the wavefront of the device and locking the fiber in place in the tiltable fiber holder (e.g., 82 in FIG. 8) with solder or epoxy, for example, a UV-curable epoxy, when the beam collimation is optimized. This could be performed after assembly of the switch fabric in an external fixture either manually or with an additional actuator capable of displacing the fiber along the fiber axis and in the x- and y-translational directions.

Figure 14:
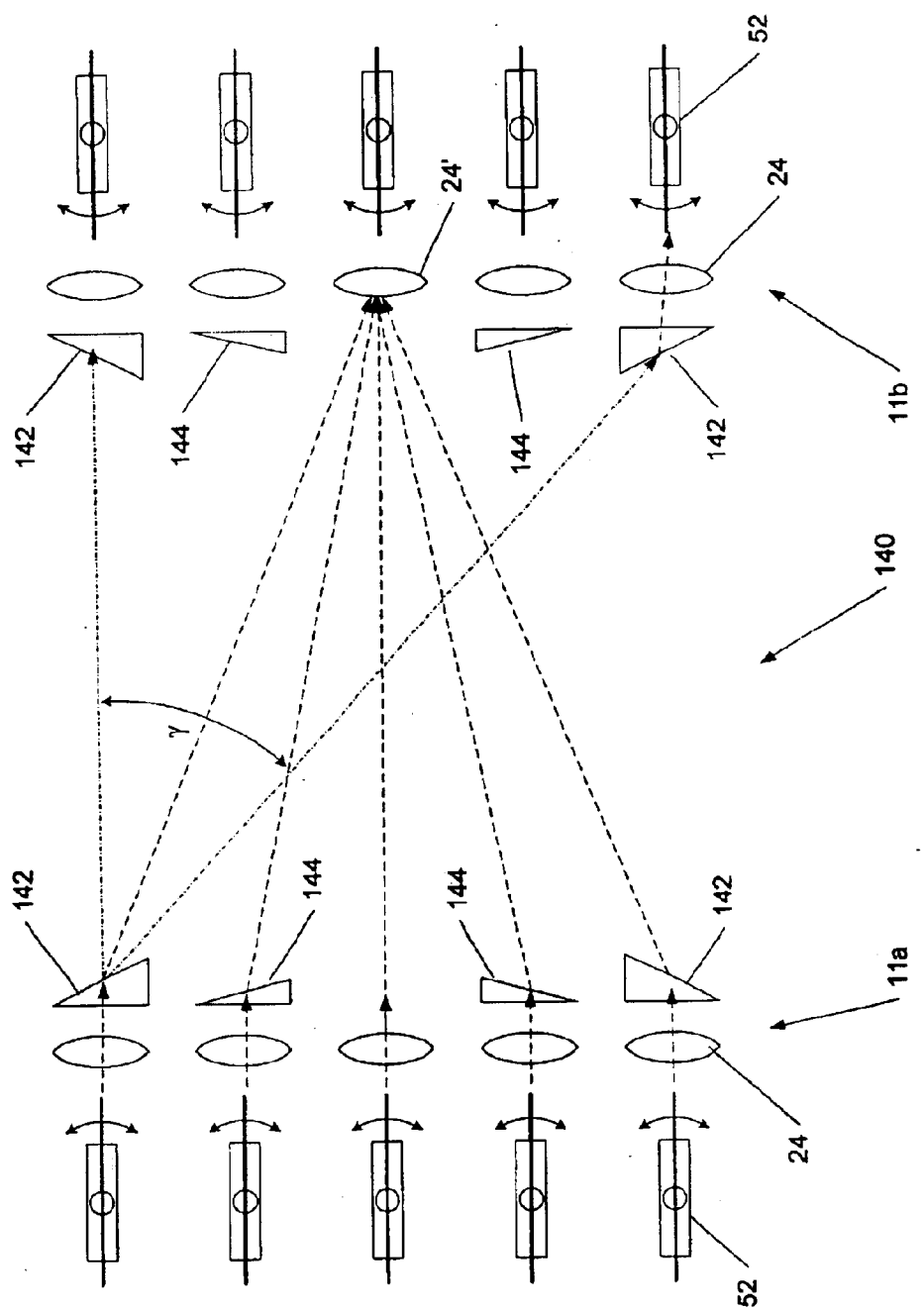
FIG. 14 shows optical elements to correct for axial offset of the optical emitters and receivers.

Referring back to FIG. 1, after the optical switch 10 which incorporates the switch fabric 140 of FIG. 14, has been assembled, the beam trajectory from each emitter 12, 14 on the emitter fabric 11a should preferably point towards the center receiver 18 on the receiver fabric 11b. In this way, the maximum deflection angle of any fiber independent of its location in the emitter fabric 11a is at most half the solid angle γ for the receiver fabric 11b.

Since all emitter elements are advantageously fabricated in an identical fashion regardless of their ultimate location in the array, the "optical" rest position of the elements, i.e., the pointing direction of the emitted beam, is preferable adjusted by placing additional optical elements, such as prisms, in front of the collimating lens of the emitters after assembly. As illustrated in FIG. 14, a beam is emitted by tiltable fiber holder 52 located on emitter fabric 11a behind stationary collimating lens 24. Without the prism 142 in the beam path, the collimated beam would impinge on the corresponding opposite lens 24 located on receiver fabric 11b and received by receiver 52. Prism 142, on the other hand, directs the same collimated beam towards the lens 24' located substantially at the center of receiver fabric 11b. The prisms can be selected based on the lateral spacing between the emitter/receiver on the corresponding fabric 11a, 11b from the center elements 24'. The prisms can be individual prism elements or a single element, similar to a Fresnel lens, applied to front of the collimator/lens assembly 136 (FIG. 13).

The overall size of switch 10 (FIG. 1) is determined by the packing density and the available solid scan angle from the beam steering devices on switch fabric 11a, 11b. The physical length of the device can be shortened by folding the optical path with a fixed mirror. The input and output ports may be on the same array, or on different arrays. Additionally the fold mirror may be curved to introduce windage and to thereby obviate the need for the additional prisms 142, 144 shown in FIG. 14 and/or reduce the required tilt angle of the beam steering elements located closer to the periphery of the switch fabric.

When the switch fabric 10, 140 is assembled, each beam steering element can reasonably be expected to have initial pointing errors. Moreover, the beam trajectories—after correction of the initial pointing errors—may change over time and during operation. It is therefore desirable to incorporate a reliable and preferably simple calibration process in the switching system. This calibration process can be performed by an off-line set-up used just after assembly and at required intervals during operation, or by a permanent on-board set-up built into the system itself.

In addition to manufacturing tolerances, variations in performance of the piezoelectric actuators as well as hysteretic or nonlinear response of the actuators need to be accounted for. The actuators may be driven by a voltage or charge drive to improve repeatability.

Figure 15:
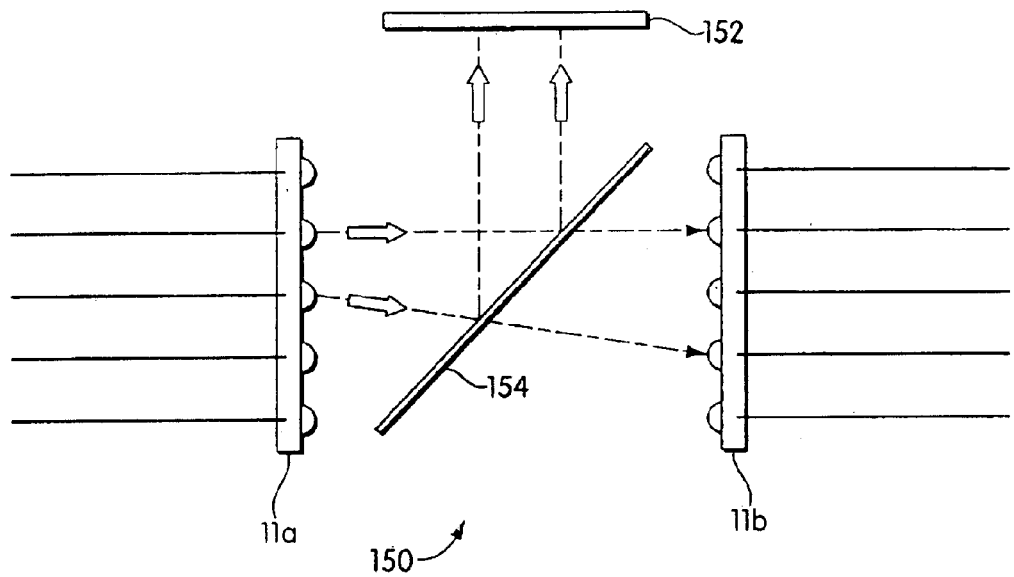
FIG. 15 shows schematically a setup for initial calibration of the switching apparatus.

Referring now to FIG. 15, the system 150 can be calibrated during the initial post manufacturing configuration using, for example, a position sensor array or camera 152. A laser beam is injected into the optical fiber, resulting in a collimated beam being launched from fabric 11a. A fraction of the beam is reflected by a partially reflecting mirror, cube beam splitter, or pellicle 154 and is received by the camera or sensor array 152. The beam steering device moves the collimated beam in a search pattern while monitoring the optical power in target fiber attached to switch fabric 11b. The beam position on the camera or sensor array 152 which corresponds to maximum power received by each target fiber is recorded in a lookup table. The process is repeated for every combination of transmit and receive fiber. Each beam steering device can then be moved to direct the beam to any desired target port by feeding back readings from the position sensor array 152. The charge required to complete a transition can also be recorded in a lookup table for every combination of transmit and receive ports. After completion of the calibration process, the beam splitter 154 and position sensor 152 may be removed. The charge data stored in the lookup table is then used during operation to move any beam steering element to a new target.

Figure 16:
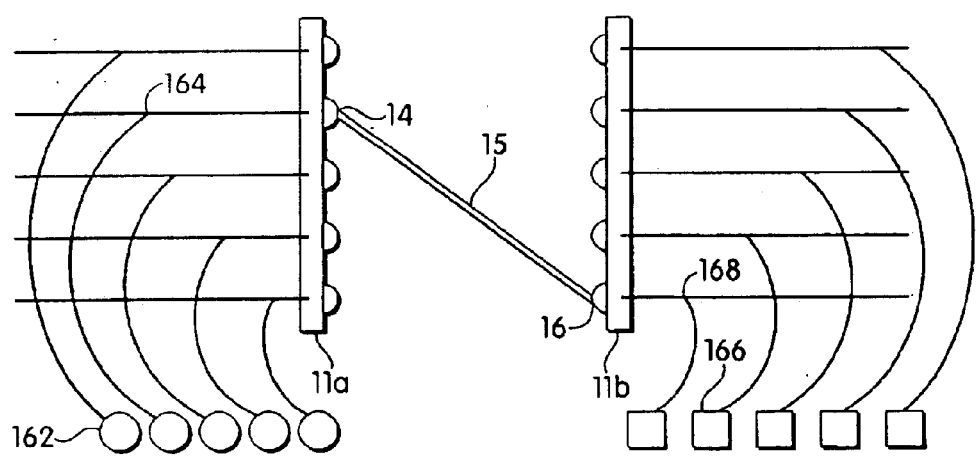
FIG. 16 shows schematically a setup for active calibration and control feedback using fiber tap couplers.

Referring now to FIG. 16, the pointing and alignment of beam 15 can be actively controlled both upon switching between ports and during operation by monitoring the power transmitted from the emitter 14 to the receiver 16. For this purpose, optical tap couplers 168 are installed in the optical fiber lines. Through these taps, the optical power at the receiver can be monitored by sensors 166 and a corrective signal can be applied to the actuators to optimize power. Alternatively, rather than measuring the communication signal, a reference laser or LED light 162, possibly at a different wavelength from the communication signal to reduce interference, can be coupled into the fibers through tap couplers 164 and again measured by sensors 166. When a different wavelength is coupled into the input side of the device, the output couplers (tap couplers) 168 can be wavelength-selective. The proposed method for actively aligning and optimizing the switch does not require or rely on additional components, such as optical quadrant detectors or capacitance sensors installed on the moving elements themselves, although this can additionally be done using capacitive or piezoresistive sensors.

With optical quadrant detectors, capacitance or piezoresistive sensors, it is fairly straightforward to implement a control loop that guides each beam to its target. However, special techniques are needed for designing a control loop based on the optical power signal alone, since the optical power signal does not contain any directional information for adjusting the signal to the actuators and thus the pointing direction of transmit or receive elements (lens and/or fibers). The control system must hence be able to ascertain the direction to move both transmit and receive elements so as to achieve maximal optical power coupling through the optical link.

Figure 17:
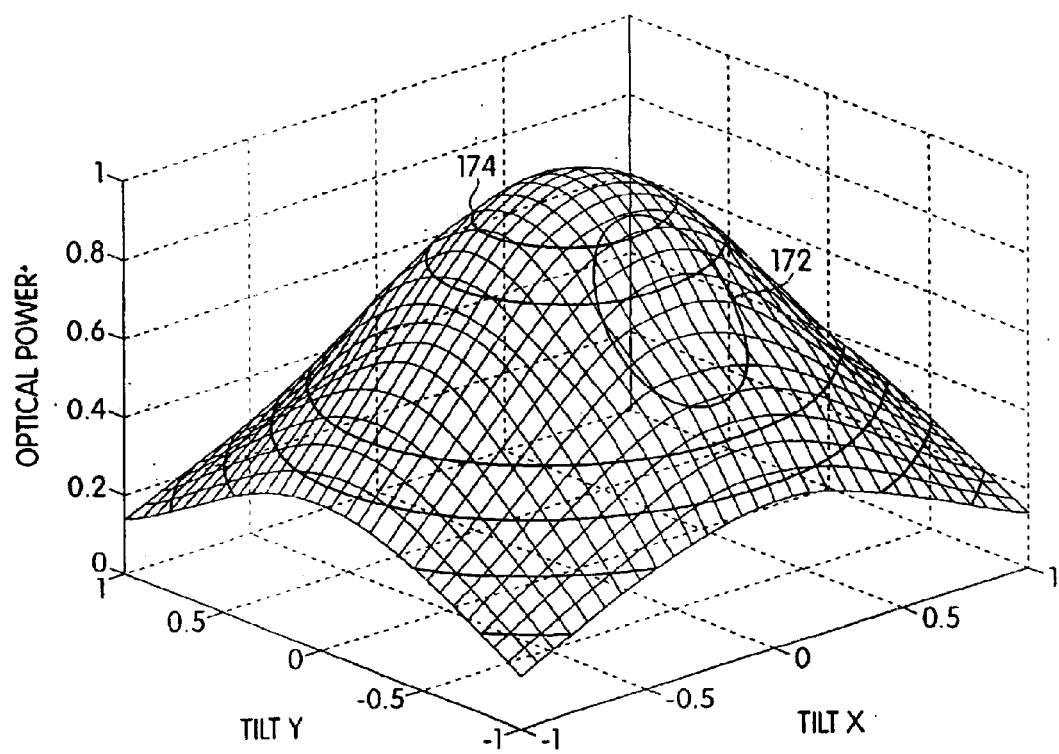
FIG. 17 shows schematically a direction modulation of the emitter/receiver for active beam alignment.

FIG. 17 is a 3-dimensional plot of the intensity of a detector 16 received from emitter 14 as a function of the tilt angles of the emitter and/or receiver beam steering element. As seen in FIG. 17, the intensity has a maximum when fiber is optimally positioned, and falls of for misalignment of the fiber tip in the x- and y-coordinate directions. When a small high frequency modulation signal (dither) is superposed on one or both of the x and y signals and the modulation signals going to each of the actuators are appropriately phased, the beam trajectory associated with the articulating emitter and/or detector element (lens and/or fiber) traces out a small orbit 172 about a nominal position, which causes a small modulation of the received optical power signal. The optimum position corresponds to an orbit 174 that is substantially symmetric about the maximum power point. More complex orbits can also be produced by using different dither waveforms. Appropriate convolution and filtering of the optical power and input modulation signals can be used to obtain the optical power gradient information (power changes associated with small perturbations of each of the actuators in the transmit and receive elements). The gradient information is then used to close the loop on the actuators and achieve the desired optical power level. The transmit and receive elements can be modulated at two different frequencies or with different dither waveforms and the power signal can be appropriately filtered to simultaneously extract gradient information for both the transmit and receive beam steering elements.

Intentional detuning of the beam pointing (caused by slight controlled misalignment of the transmit and receive ports) within a switch can be used to introduce controllable amounts of optical insertion loss for a variable optical attenuator (VOA) function. This feature can be used to implement stand-alone single VOAs or compact multichannel parallel arrays of VOAs. The attenuator feature can also be used in conjunction with the switching operation to balance powers in optical networks without requiring separate VOAs in addition to the switching matrix. This functionality can be achieved by increasing the amplitude of the modulation on the actuators. The beam will then trace an orbit with larger diameter about the optimum position. As the diameter of the orbit is increased, the optical insertion loss of the system is increased, thus providing VOA functionality.

The orientation at which the power is maximized may vary slightly depending on the wavelength of the optical signal. This variation is caused by dependence of properties of optical elements on wavelength. Therefore, additional compensation is needed in the case where an optional reference laser or LED source 162 of differing wavelength from the communication signal is used to close the loop. Additionally, servoing the modulation signal to a given intensity amplitude can be done using a variety of control techniques.

Figure 18:
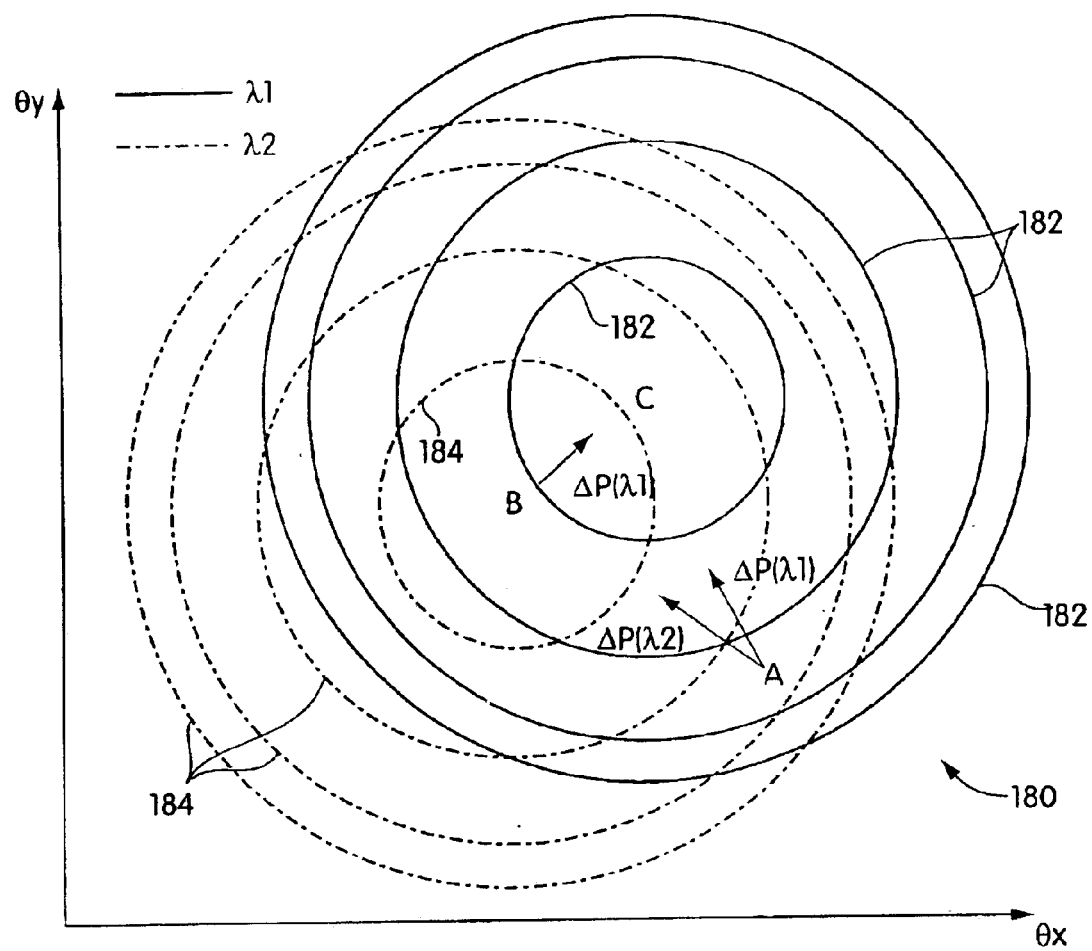
FIG. 18 shows schematically optical power contours at two different wavelengths for optical power control and beam alignment.

FIG. 18 shows optical power contours 180 at two different wavelengths as a function of orientation of beam pointing angle. Solid lines 182 correspond to a wavelength $\lambda_1$, for example, the wavelength of a reference signal emitted by laser or LED source 172. Dotted lines 184 correspond to wavelength $\lambda_2$ corresponding to the wavelength of the optical communication signal whose power is to be maximized (or optionally attenuated). During the calibration process, the optical power of both $\lambda_1$ and $\lambda_2$ beams is measured, which may require separate power sensors. At a typical point A neither wavelength is at peak power. At point B, the optical communication signal $\lambda_2$ is at peak power, while at point C the reference signal $\lambda_1$ is at peak power. Thus, using the modulation technique described above, the gradient of the power signal with respect to position can be found for either wavelength. The control loop is then closed based on the gradient of $\lambda_2$ power until the device settles at point B. The insertion loss of the $\lambda_1$ signal as well as its gradient vector is then recorded in a calibration table. This calibration process is repeated for each of the beam steering devices in the switch. During operation, the orientation of the optical elements may then be controlled by servoing the strength and gradient of the reference signal $\lambda_1$ to the values stored in the calibration table.

While the invention has been disclosed in connection with the preferred embodiments shown and described in detail, various modifications and improvements thereon will become readily apparent to those skilled in the art. For example, the emitters and receivers described herein are not limited to optical fibers, but can include other optical waveguides and other emitters, such as lasers and LEDs, as well as conventional detectors. The materials described in connection with the actuation mechanism and the optical system are merely examples, and those skilled in the art will be able to identify and use other materials suitable for the application, such as shape-metal alloys, electrically active polymers or any other material that may be electrically or magnetically activated. Accordingly, the spirit and scope of the present invention is to be limited only by the following claims.

We claim:

1. An optical switch, comprising
   an actuator for generating a mechanical movement,
   an optical device, and
   a motion transformer having a compliant member for coupling with the optical device and for coupling to an actuator capable of generating a mechanical movement, for generating amplified relative mechanical movement between the actuator and the optical device for selectively changing position of the optical device in two orthogonal directions.

2. An optical switch according to claim 1, wherein the motion transformer is formed as a unitary body.

3. An optical switch according to claim 1, wherein the motion transformer comprises a layered sub-assembly.

4. An optical switch according to claim 1, wherein the motion transformer comprises an assembly of micromachined layers.

5. An optical switch according to claim 1, wherein the motion transformer comprises an assembly of micromachined silicon wafers.

6. An optical switch according to claim 1, further comprising a plurality of said motion transformers formed on a substrate.

7. An optical switch according to claim 6, wherein the plurality of motion transformers are formed on the substrate as a linear array.

8. An optical switch according to claim 6, wherein the plurality of motion transformers are formed on the substrate as a two-dimensional array.

9. An optical switch according to claim 6, further comprising a plurality of said substrates organized as switching sub-arrays.

10. An optical switch according to claim 6, further including a plurality of actuators coupled to respective ones of said plurality of motion transformers.

11. An optical switch according to claim 6, further comprising a lens positioned for focusing light carried through the optical device.

12. An optical switch according to claim 11, having the lens disposed to achieve a selected unactuated beam angle.

13. An optical switch according to claim 6, wherein the substrate comprises a curved substrate.

14. An optical switch according to claim 1, further comprising a substrate having a plurality of motion transformers formed thereon, and an array of lenses or prisms positioned relative to a respective one of the motion transformers and being disposed to achieve a selected unactuated beam angle.

15. An optical switch according to claim 1, further including electrical interconnections disposed on said actuator.

16. An optical switch according to claim 1, wherein the actuator is selected from the group consisting of piezoelectric actuator, an electrostrictive actuator, a magnetostrictive actuator, an electrostatic actuator, a thermal actuator, an electromagnetic actuator, a shape memory alloy, and an electroactive polymer.

17. An optical switch according to claim 1, wherein the actuator comprises a cylindrical tube actuator.

18. An optical switch according to claim 1, wherein the actuator comprises a plurality of actuators.

19. An optical switch according to claim 1, wherein the actuator comprises an actuator formed of a plurality of discrete actuators operating under independent control.

20. An optical switch according to claim 1, wherein the actuator comprises a stack of independently controlled actuators.

21. An optical switch according to claim 1, wherein the actuator comprises a bending actuator.

22. An optical switch according to claim 1, wherein the actuator comprises a linear actuator.

23. An optical switch according to claim 1, wherein the actuator comprises an injection-molded ceramic actuator.

24. An optical switch according to claim 1, further comprising a position control system electrically coupled to the actuator for controlling mechanical movement of the actuator.

25. An optical switch according to claim 1, further comprising a position sensing mechanism for sensing a position representative of the position of the optical device.

26. An optical switch according to claim 1, further comprising a position sensing mechanism for sensing a position of the optical device.

27. An optical switch according to claim 1, further comprising a position sensing mechanism for sensing a position of the motion transformer.

28. An optical switch according to claim 1, further comprising a position sensing mechanism for sensing a position of the actuator.

29. An optical switch according to claim 1, further comprising a holding element coupled to the motion transformer and adapted for holding an optical device.

30. An optical switch according to claim 29, wherein the holding element is adapted for holding an optical device selected from the group consisting of a fiber, a lens, a lensed fiber, a mirror, a grating, a collimator, a prism, and a filter.

31. An optical switch according to claim 1, wherein the optical device includes a device selected from the group consisting of a fiber, a lens, a lensed fiber, a mirror, a grating, a collimator, a prism, and a filter.

32. An optical switch according to claim 31, wherein the lens comprises a lens selected from the group consisting of a refractive lens, a gradient index lens, a Fresnel lens, a diffractive optical element, a telescopic lens assembly and a holographic element.

33. The optical switch of claim 1, wherein the motion transformer comprises
   a first connection to the actuator,
   a second connection to the optical device, and
   a third connection to a support housing.

34. An optical switch, comprising
   a plurality of actuators for generating a mechanical movement,
   a plurality of optical devices,
   a plurality of motion transformers formed on a substrate and having compliant members for coupling with respective ones of the optical devices and with one or more of the actuators for selectively changing positions of the optical devices, and
   an array of lenses or prisms positioned relative to the motion transformers and being disposed with
      a varying pitch between lenses or prisms in the array for achieving a selected unactuated optical beam angle.

35. An optical switch comprising
   a plurality of actuators for generating a mechanical movement,
   a plurality of optical devices,
   a plurality of motion transformers formed on a curved substrate and having compliant members for coupling with respective ones of the optical devices and with one or more of the actuators for selectively changing positions of the optical devices, and
   a curved array of lenses disposed above the plurality of motion transformers formed on the curved substrate.

36. An optical switch comprising an actuator for generating a mechanical movement, an optical device, a motion transformer having a compliant member for coupling with the optical device and for coupling to an actuator capable of generating a mechanical movement, for generating relative mechanical movement between the actuator and the optical device for selectively changing position of the optical device, and a mirror for reflecting light traveling through the optical device.

37. The optical switch according to claim 36, wherein the motion transformer is formed as a unitary body.

38. An optical switch according to claim 36, wherein the motion transformer comprises a layered sub-assembly.

39. An optical switch according to claim 36, wherein the motion transformer comprises an assembly of micro-machined layers.

40. An optical switch according to claim 36, wherein the motion transformer comprises an assembly of micro-machined silicon wafers.

41. An optical switch according to claim 36, further comprising a plurality of said motion transformers formed on a substrate.

42. An optical switch according to claim 36, wherein the actuator is selected from the group consisting of piezoelectric actuator, linear actuator, bending actuator, cylindrical tube actuator, electrostrictive actuator, magnetostrictive actuator, electrostatic actuator, thermal actuator, electromagnetic actuator, shape memory alloy, and electroactive polymer.

43. An optical switch according to claim 36, wherein the optical device includes a device selected from the group consisting of a fiber, a lens, a lensed fiber, a mirror, a grating, a collimator, a prism, and an optical filter.

44. An optical switch according to claim 36, and further including a control system that controls a position of at least one of the optical device, the motion transformer and the actuator based on the reflected light traveling through the optical device.

45. An optical switch comprising an actuator for generating a mechanical movement, an optical device, a motion transformer having a compliant member for coupling with the optical device and for coupling to an actuator capable of generating a mechanical movement, for generating relative mechanical movement between the actuator and the optical device for selectively changing position of the optical device, and a beam splitter for directing light to a control system.

46. The optical switch according to claim 45, wherein the motion transformer is formed as a unitary body.

47. An optical switch according to claim 45, wherein the motion transformer comprises a layered sub-assembly.

48. An optical switch according to claim 45, wherein the motion transformer comprises an assembly of micro-machined layers.

49. An optical switch according to claim 45, wherein the motion transformer comprises an assembly of micro-machined silicon wafers.

50. An optical switch according to claim 45, further comprising a plurality of said motion transformers formed on a substrate.

51. An optical switch according to claim 45, wherein the actuator is selected from the group consisting of piezoelectric actuator, linear actuator, bending actuator, cylindrical tube actuator, electrostrictive actuator, magnetostrictive actuator, electrostatic actuator, thermal actuator, electromagnetic actuator, shape memory alloy, and electroactive polymer.

52. An optical switch according to claim 45, wherein the optical device includes a device selected from the group consisting of a fiber, a lens, a lensed fiber, a mirror, a grating, a collimator, a prism, and an optical filter.

53. An optical switch according to claim 45, wherein the control system controls a position of at least one of the optical device, the motion transformer and the actuator.

54. An optical switch for switching a beam of light, comprising a transmitter and a receiver at least one of which having an optical device, an actuator for generating a mechanical movement, and a motion transformer responsive to movement of the actuator for imparting amplified actuator motion on the optical device to allow for selectively steering and focusing the beam of light in at least two orthogonal directions.

55. Optical switch according to claim 54, further comprising a plurality of transmitters.

56. An optical switch according to claim 54, further comprising a plurality of receivers.

57. An optical switch according to claim 54, further comprising an optical device disposed between the transmitter and the receiver.

58. An optical switch according to claim 57, wherein the optical device is selected from the group consisting of a pellicle, a mirror, a lens, a grating, and a dispersive curved mirror.

59. A method for switching an optical circuit, comprising supporting an optical device within a compliant member, positioning the optical device within an optical path of the circuit, and applying a mechanical displacement to the compliant member to cause the compliant member to flex and change the position of the optical device by a distance that is greater than the applied mechanical displacement, thereby altering the optical path of the optical circuit in at least two orthogonal directions.

* * * * *